(12) United States Patent
Andress et al.

(10) Patent No.: US 9,716,689 B2
(45) Date of Patent: Jul. 25, 2017

(54) SECURED PRESENTATION LAYER VIRTUALIZATION FOR WIRELESS HANDHELD COMMUNICATION DEVICE

(75) Inventors: Mark Andress, St. Cathannes (CA); Trevor Dietrich, Waterloo (CA); Kevin Dixon, Oakville (CA); Duncan Noble, Mississauga (CA)

(73) Assignee: BlackBerry Limited, Waterloo (CA)

( * ) Notice: Subject to any disclaimer, the term of this patent is extended or adjusted under 35 U.S.C. 154(b) by 1165 days.

(21) Appl. No.: 12/837,264

(22) Filed: Jul. 15, 2010

(65) Prior Publication Data
US 2010/0281258 A1    Nov. 4, 2010

Related U.S. Application Data

(63) Continuation of application No. PCT/CA2009/000046, filed on Jan. 16, 2009.

(60) Provisional application No. 61/021,357, filed on Jan. 16, 2008, provisional application No. 61/095,387, filed on Sep. 9, 2008.

(51) Int. Cl.
*H04L 29/06* (2006.01)
*H04W 12/06* (2009.01)
*H04W 12/04* (2009.01)

(52) U.S. Cl.
CPC ......... *H04L 63/0281* (2013.01); *H04W 12/06* (2013.01); *H04L 63/0272* (2013.01); *H04L 63/061* (2013.01); *H04W 12/04* (2013.01)

(58) Field of Classification Search
CPC .............. G06F 21/105; H04L 63/0281; H04L 63/0272; H04L 63/061; H04W 12/06; H04W 12/04

USPC ......................................................... 713/153
See application file for complete search history.

(56) References Cited

U.S. PATENT DOCUMENTS

| 5,175,851 | A | * | 12/1992 | Johnson et al. | |
|---|---|---|---|---|---|
| 5,673,259 | A | * | 9/1997 | Quick, Jr. | 370/342 |
| 5,673,322 | A | * | 9/1997 | Pepe et al. | 705/52 |
| 6,324,564 | B1 | * | 11/2001 | Thielke et al. | 709/202 |

(Continued)

OTHER PUBLICATIONS

Subhasis Saha; Bringing the Wireless Internet to Mobile Devices; Year: 2001; IEEE; pp. 1-5.*

(Continued)

*Primary Examiner* — Monjour Rahim
(74) *Attorney, Agent, or Firm* — Moffat & Co.

(57) ABSTRACT

The connectivity and security of wireless handheld devices (HDs) can be leveraged to provide a presentation appliance (PA) such as a laptop with an ability to securely communicate with an enterprise's private network. A split-proxy server, with part of it executing on the HD and a part executing on the PA, implements a full HTTP 1.1 compliant Internet/Web Proxy to couple the PA for communication through the HD. Specifically, the split proxy provides support for the pragmatic keep-alive header, the CONNECT method, socket connection sharing, and thread pooling, to enable a fully functional browsing environment. Such an environment enables access to commercial web-based applications that are built on standard Internet technologies without the need for re-rendering or re-writing the user interfaces to suit the HD. In addition, Intranet web-based applications are made securely accessible without the need for additional VPN and remote access technologies.

26 Claims, 20 Drawing Sheets

(56) References Cited

U.S. PATENT DOCUMENTS

| | | | |
|---|---|---|---|
| 6,405,362 B1* | 6/2002 | Shih | G06F 8/61 713/1 |
| 7,532,571 B1* | 5/2009 | Price et al. | 370/225 |
| 7,984,253 B1* | 7/2011 | Glade et al. | 711/154 |
| 2002/0163895 A1* | 11/2002 | Haller et al. | 370/335 |
| 2003/0088682 A1* | 5/2003 | Hlasny | H04L 12/5693 709/229 |
| 2003/0177384 A1 | 9/2003 | Jones et al. | |
| 2003/0235206 A1* | 12/2003 | Heller | 370/467 |
| 2004/0249900 A1* | 12/2004 | Karstens | H04L 12/581 709/207 |
| 2005/0204127 A1* | 9/2005 | Dive-Reclus et al. | 713/152 |
| 2006/0182149 A1* | 8/2006 | Ramsdale | 370/516 |
| 2008/0195854 A1* | 8/2008 | Choi | 713/2 |
| 2008/0222242 A1* | 9/2008 | Weiss et al. | 709/203 |
| 2008/0307219 A1* | 12/2008 | Karandikar | 713/153 |
| 2009/0172802 A1* | 7/2009 | Mosek et al. | 726/12 |
| 2009/0183199 A1* | 7/2009 | Stafford et al. | 725/34 |
| 2010/0040030 A1* | 2/2010 | Kakumaru | 370/338 |
| 2011/0105090 A1* | 5/2011 | Shackleton | 455/414.1 |
| 2011/0200027 A1* | 8/2011 | Bishop et al. | 370/338 |
| 2012/0059780 A1* | 3/2012 | Kononen et al. | 706/14 |

OTHER PUBLICATIONS

International Preliminary Report on Patentability issued by the International Bureau of WIPO dated Jul. 29, 2010 for corresponding International application No. PCT/CA2009/000046.

International Search Report issued by the Canadian Intellectual Property Office dated May 5, 2009 for corresponding International application No. PCT/CA2009/000046.

Written Opinion of the International Searching Authority issued by the Canadian Intellectual Property Office dated May 5, 2009 for corresponding International application No. PCT/CA2009/000046.

"What Is—Using the BlackBerry wireless device as a network connection for the BlackBerry Simulator" http://www.blackberry.com/knowledgecenterpublic/livelink.exe/fetch/2000/348583/800792/801083/What_Is_-_Using_the_BlackBerry_wireless)device_as_a_network_connection_for_the_BlackBerry_Simulator.html?nodeid=801087&vernum=0 Jun. 9, 2006 (Jun. 9, 2006).

"Tethered Modem" http://web.archive.org/web/20071226031131/http://na.blackberry.com/eng/devices/features/tethered_modem.jsp Dec. 26, 2007 (Dec. 26, 2007).

Canadian Intellectual Property Office, Office Action on Application No. 2,712,026, Issued on Jun. 25, 2015.

European Patent Office, Extended European Search Report for Application No. 09701800.6, issued on May 29, 2017.

* cited by examiner

SECURED PRESENTATION LAYER VIRTUALIZATION FOR WIRELESS HANDHELD COMMUNICATION DEVICE

CROSS-REFERENCE

This is a continuation of International Application No. PCT/CA2009/000046 with an international filing date of Jan. 16, 2009, which International Application claims the benefit of respective U.S. Provisional Application Nos. 61/021,357 filed Jan. 16, 2008 and 61/095,387 filed Sep. 9, 2008, the contents of all of which applications are incorporated herein by reference

FIELD

The present invention relates generally to communications via wireless handheld communication devices and to a system and method for the secured virtualization of a presentation layer of such a device on an endpoint such as a laptop or other presentation appliance.

BACKGROUND OF THE INVENTION

Organizations and enterprises, both public and private (including government, business, education, health care and other institutions, among others) are struggling with many challenges around securing information assets while trying to support mobile workers through the use of rapidly evolving wireless computing technologies. The choices are costly and complicated. Mobile workers want to remain connected with their enterprises when mobile and often rely upon wireless handheld communication devices such as cellular telephones, PDAs, etc. for messaging and other applications.

BlackBerry® from Research In Motion Ltd. stands out as the dominant mobile device and supporting infrastructure that is trusted by IT departments to be authenticated to safely access information assets—both on the device and in the enterprise. Other commercially available handheld mobile devices and/or systems therefor include Palm Treo, Pocket PC and other devices executing Good Mobile Messaging and Intranet from Motorola Good Technology Group, Motorola, Nokia, Palm Treo and other devices executing Seven software from Seven Networks, Inc., Apple's iPhone, devices executing Microsoft's Mobile 5 (M5) platform, and devices executing Google Inc.'s Android platform, among others.

BlackBerry devices are wireless handheld communication devices comprising relatively small display and keyboard interfaces. The strength of these devices lays in their secure and reliable communication capabilities. They are not intended to be general purpose computing devices. Often mobile workers have both a BlackBerry device and a laptop computing device to meet all of their needs.

Organizations have invested significantly in secure infrastructure for remote access with technologies like: Citrix, RSA ID, and Virtual Private Networks (VPNs) to enable laptops and other remotely located computing devices to connect in a secure manner to the enterprise (i.e. to the organizations' private networks via the public Internet). As well, some organizations empower their mobile workers with "Air Cards" to enable their laptops to connect to the enterprise, using the incumbent security infrastructure (e.g. VPNs), over the same wireless networks (e.g. cellular networks) supporting the BlackBerry. Yet in general, many people with laptops that require remote access beyond email also carry a BlackBerry—an already trusted conduit to the enterprise.

Organizations prefer not to manage disparate technologies that achieve the same results. Leading organizations have a vision of "endpoint independence"; meaning organizations can allow their users to select and use whatever endpoint computer they want as their personal computing device, leaving the user to maintain that computer and keep it free of viruses, allowing them to use the computer both for business and personal use, while the assets of the enterprise remain controlled, monitored, and secured.

In situations in which the endpoint computer is not managed by the enterprise, there is concern over the potential for sensitive data to be left behind on the endpoint computer (e.g. PC, laptop). In situations in which data is moved from a user's handheld device to the endpoint computer's resident applications (e.g. Microsoft Word or Excel), there is a risk that temporary files that contain such data could be left behind after the user's session ends.

Thus it is desirable to provide a solution that will allow the mobile user to connect from a laptop or other presentation appliance that is capable of executing a web browser, to their wireless handheld communication device (e.g. BlackBerry). By virtualizing the presentation layer of the handheld and running the applications on the handheld, using the laptop as a presentation device, users can leverage the secure connection to the enterprise from the handheld. The laptop can leverage the handheld's radio access technology to connect to a wireless network and operate the handheld's secure communication capabilities to authenticate to the enterprise's private network. It may also be desirable that no data trace (i.e. "zero residuals") of sensitive information be left behind on the laptop or other endpoint computer.

SUMMARY

In accordance with one aspect of the invention, there is provided a method for communicating data. The method comprises coupling a wireless handheld communication device configured to communicate data securely within a public wireless network with a presentation appliance for virtualizing a presentation layer of the handheld to a user. The appliance and handheld define a split proxy server such that the appliance is also configured to communicate data securely within the public wireless network through the handheld. The method further comprises executing a user interface on said appliance to virtualize the presentation layer and permit the user to selectively operate the data communications.

In accordance with a further aspect there is provided a data communication system. The system comprises a wireless handheld communication device configured to communicate data securely over a public wireless network; and a presentation appliance for virtualizing a presentation layer of the handheld to a user. The appliance and handheld are communicatively coupled for data communication via a split proxy such that the appliance is also configured to communicate data securely within the public wireless network through the handheld. The appliance is provided with a user interface to virtualize the presentation layer and permit the user to selectively operate the data communications.

In accordance with yet another aspect, there is provided a computer-readable storage medium having computer executable instructions stored thereon for adapting a wireless handheld device configured to communicate data securely within a public wireless network and a presentation appliance for data communications. The instructions include first code means for adapting the handheld and second code means for adapting the appliance such that when the first and second code means are executed by respective processors of the handheld and appliance, the handheld and appliance are communicatively coupled for data communication via a split proxy such that the appliance is also configured to communicate data securely within the public wireless network through the handheld. Further the second code means provide the appliance with a user interface to virtualize a presentation layer of the handheld and permit a user to selectively operate the data communications.

In a further aspect there is provided a network data communications system. The network data communications system comprises a network server supporting secure data communications by wireless handled communication devices over a public wireless network, said server providing end to end data encryption with respect to the wireless handled communication devices: a plurality of handhelds configured to communicate data securely over the public wireless network via said network server; and, for at least one of the handhelds, a presentation appliance for virtualizing a presentation layer of the handheld to a user wherein the appliance and handheld are communicatively coupled for data communication via a split proxy such that the appliance is also configured to communicate data securely within the public wireless network through the handheld and network server, said appliance executing a user interface to virtualize the presentation layer and permit the user to selectively operate the data communications.

These and further features will be apparent to those of ordinary skill in the art.

BRIEF DESCRIPTION OF THE DRAWINGS

An embodiment of the invention will now be described by way of example only with reference to the following drawings in which.

For convenience, like numerals in the description refer to like structures in the drawings.

DETAILED DESCRIPTION

Figure 1:
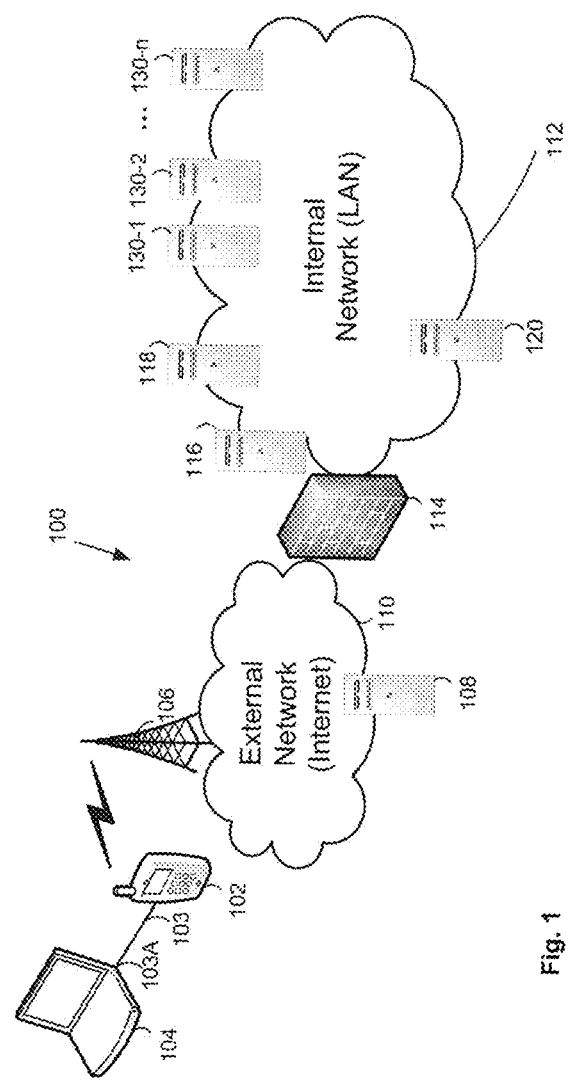
FIG. 1 is a block diagram showing an example communication network wherein a presentation appliance is coupled via a handheld device to an enterprise local area network.

In accordance with various aspects, the connectivity and security of wireless handheld devices (HDs) can be leveraged to provide a presentation appliance (PA) such as a laptop with an ability to securely communicate with an enterprise's private network. A split-proxy server, with part of it executing on the HD and a part executing on the PA, implements a full HTTP 1.1 compliant Internet/Web Proxy to couple the PA for communication through the HD. Specifically, the split proxy provides support for the pragmatic keep-alive header, the CONNECT method, socket connection sharing, and thread pooling, to enable a fully functional browsing environment. Such an environment enables access to commercial web-based applications that are built on standard Internet technologies without the need for re-rendering or re-writing the user interfaces to suit the HD. In addition, Intranet web-based applications are made securely accessible without the need for additional VPN and remote access technologies.

Extending the HD's HTTP proxy to provide access to the HD's resources, via a browser and rendering resources in a combination of XML/HTML/JavaScript and other web presentation technologies, allows the HD to serve as a lightweight "personal" web server. A "viewer" application is preferably provided to access the HD's applications such as email, contacts, so that the presentation layer is virtualized through the PA and a user can selectively operate the data communication functions. No application data need be persistently stored on the PA. In one embodiment, when the HD and PA cease communicating (e.g. due to a lost Bluetooth or other communication connection as described further below) the PA viewer application automatically closes and no data from the HD remains.

In one embodiment, communications between the handheld and presentation appliance may be robustly secured. Utilizing the HD's secure connection to the wireless network and a secure TLS tunnel that is enabled by the split-proxy, a private key for securing the connection between the HD and the PA can be securely exchanged. A pseudo-random private key may be requested from a key server (e.g. coupled behind the enterprise's LAN firewall) by the HD. The key server responds to the HD with the pseudo-random private key and an additional pseudo-random third-factor authentication token. The third-factor token is presented to the user (e.g. by showing it on the screen of the HD). The HD-side of the split proxy now has the private key to be used for securing the channel between it and the PA-side of the split proxy. The user can be prompted to enter the third-factor authentication token presented on the HD into the PA-side split proxy interface or viewer application. The PA-side then establishes a TLS secure connection to the same key server, this time providing the third-factor authentication token, and in return receives the same private key that was delivered to the HD. Thus both sides of the split proxy have the same private key retrieved in a secure manner. Both sides of the split proxy are then enabled to exchange highly secure encrypted data using the private key.

In one embodiment, a combined USB/Bluetooth flash drive may be configured to provide executable components for the invention as well as Bluetooth short range radio communication capabilities to the presentation appliance. The flash drive may provide a store for executable code for the PA-side split proxy and viewer, etc. as well as for transient data so that the presentation appliance's native persistent storage devices need not be used. Removal of the flash drive can trigger automatic cessation of the split proxy and the presentation layer virtualization (e.g. viewer). Similarly stopping short range communications between the handheld and appliance (such as by moving the handheld or appliance so that the devices are out of range of one another) can also trigger the automatic cessation. While it may be preferred to communicate via Bluetooth and using a consistent Bluetooth device and associated stack, other communication capabilities such as a presentation device's native Bluetooth capability or wired serial coupling via USB etc. may also be used. In yet a further embodiment, a flash drive without Bluetooth may be used to provide a store for the executable code for the PA-side split proxy and viewer, etc. as well as for transient data so that the presentation appliance's native persistent storage devices need not be used. Removal of this flash drive can trigger automatic cessation of the split proxy and the presentation layer virtualization (e.g. viewer). The handheld may be connected by wired (e.g. serial USB) connection. Removal of the connection may also trigger cessation automatically.

In one embodiment, a virtual file system (VFS) space may be created to appear to the execution components of the PA-side to be storage space on the PA-side whereas the space is a mount point over the transport layer to the file system of the HD. This enables the PA execution components to perform as if a normal file system was supporting the execution when in fact the data is securely retrieved from and saved to the HD. When an HD is connected to the PA via the split proxy, applications (e.g. commonly available third party applications) can function normally without knowing they are writing back through to the HD storage. In other words, third party applications can work without retrofit and be loaded from the PA directly or via the PA Viewer and in fact even loaded from the storage on the HD.

WebDAV services atop of the VFS components may enable BD flash storage to be accessible while not in mass storage mode. Alternatively the VFS drive mount is not established and only WebDAV compliant applications are capable to access the HD data via the VFS conduit.

These and other features will be apparent to those of ordinary skill in the art.

FIG. 1 illustrates representative communications network 100 wherein a wireless handheld communication device 102 (hereinafter HD 102) is coupled wirelessly for secure communication via external networks 106 and 110 to an enterprises' internal network, namely a private local area network (LAN) 112. In accordance with an embodiment of the invention, a presentation layer (discussed further below) of HD 102 is virtualized to a presentation appliance (PA) 104, namely a laptop, thereby to couple PA 104 to LAN 112.

PA 104 and HD 102 communicate via coupling 103. In one embodiment the coupling comprises a short range wireless communication coupling, preferably via Bluetooth® as described further herein below. Persons of ordinary skill in the art will appreciate that these devices may be coupled for communication using other technology such as wired serial communication (USB, RS 232, etc.), among others. In a preferred embodiment a combined USB/Bluetooth flash drive 103A is coupled to PA 104 to provide executable components for the invention as well as Bluetooth communication capabilities PA 104.

HD 102 communicates wirelessly via a wireless wide area network (WWAN) 106 such as a cellular telephone network (e.g. a GSM/GPRS, EDGE or other such network) or a wireless local area network (WLAN) (e.g. 802.11 or Wi-MAX network (not shown)). As is well known, HD data communications via WWAN 106 are supported by a handheld device services network (e.g. BlackBerry® Network) represented by infrastructure 108 to transmit data between HD 102 and LAN 112 or other HDs (not shown). LAN 112 and HD services network infrastructure 108 may be coupled for communication via the external network (Internet) 110 or a private network (not shown)

By way of example, components of LAN 112 may comprise a firewall 114, a handheld device enterprise server 116, an enterprise email server 118 and additional proxy server 130 or servers 130-1, 130-2, . . . 130-*n*. Other LAN network components may include application server(s), backend server(s), databases, etc. (e.g. per representative server 120) for providing content to devices on the LAN, including HD 102. In some embodiments, a plurality of proxy servers 130-1, 130-2, . . . 130-*n* may be provided, for example, where respective servers handle respective requests in response to a request type. In other embodiments, a single proxy server (e.g. 130) maybe provided to handle all types. A person of ordinary skill in the art will appreciate that various wireless and public network infrastructure is omitted for clarity.

HD enterprise server 116 provides a centralized link between wireless devices, enterprise applications and wireless networks, to provide secure wireless communications and corporate data to mobile users. Important features include end-to-end encryption and wireless application support for email, calendar and address book. HD enterprise server preferably includes integration with enterprise applications such as Microsoft® Exchange, IBM® Lotus® Domino®, or Novell® Groupwise®, etc.

In one embodiment where HD 102 comprises a BlackBerry device, HD enterprise server 116 preferably comprises a BlackBerry Enterprise Server that "delivers end-to-end Advanced Encryption Standard (AES) or Triple Data Encryption Standard (3DES) encryption that helps ensure the confidentiality and integrity of wirelessly transmitted information from behind the firewall to wireless devices in the field". As well, the BlackBerry Enterprise Server provides push-based access to email; calendar, contacts, tasks and notes; instant messaging; web-based applications and services and enterprise applications. Other related servers (not shown e.g. BlackBerry Enterprise MDS) may be employed to provide mobile data support to the handheld devices (e.g. HD 102) to provide content from servers 120 wirelessly. Though illustrated as separate components of LAN 112, persons of ordinary skill will appreciate that various combinations of hardware/software may be configured to provide such capabilities.

In accordance with preferred features of the invention, end-to-end encryption can be provided such that either 1) data is encrypted between the two sides of the split proxy and then either stored on the HD or immediately transmitted from the HD to the target server using another secure transport—that being either a secure 3DES/AES connection (e.g. via BES), or an SSL or TLS connection or 2) that the PA has established a TLS connection, via the split-proxy's tunnelling capability (descried further below), directly to the target server. Hence in a network configuration where a supporting server such as a BES server for 3DES/AES is not available (not shown), an SSL connection from the HD to the target server can be substituted.

Figure 2:
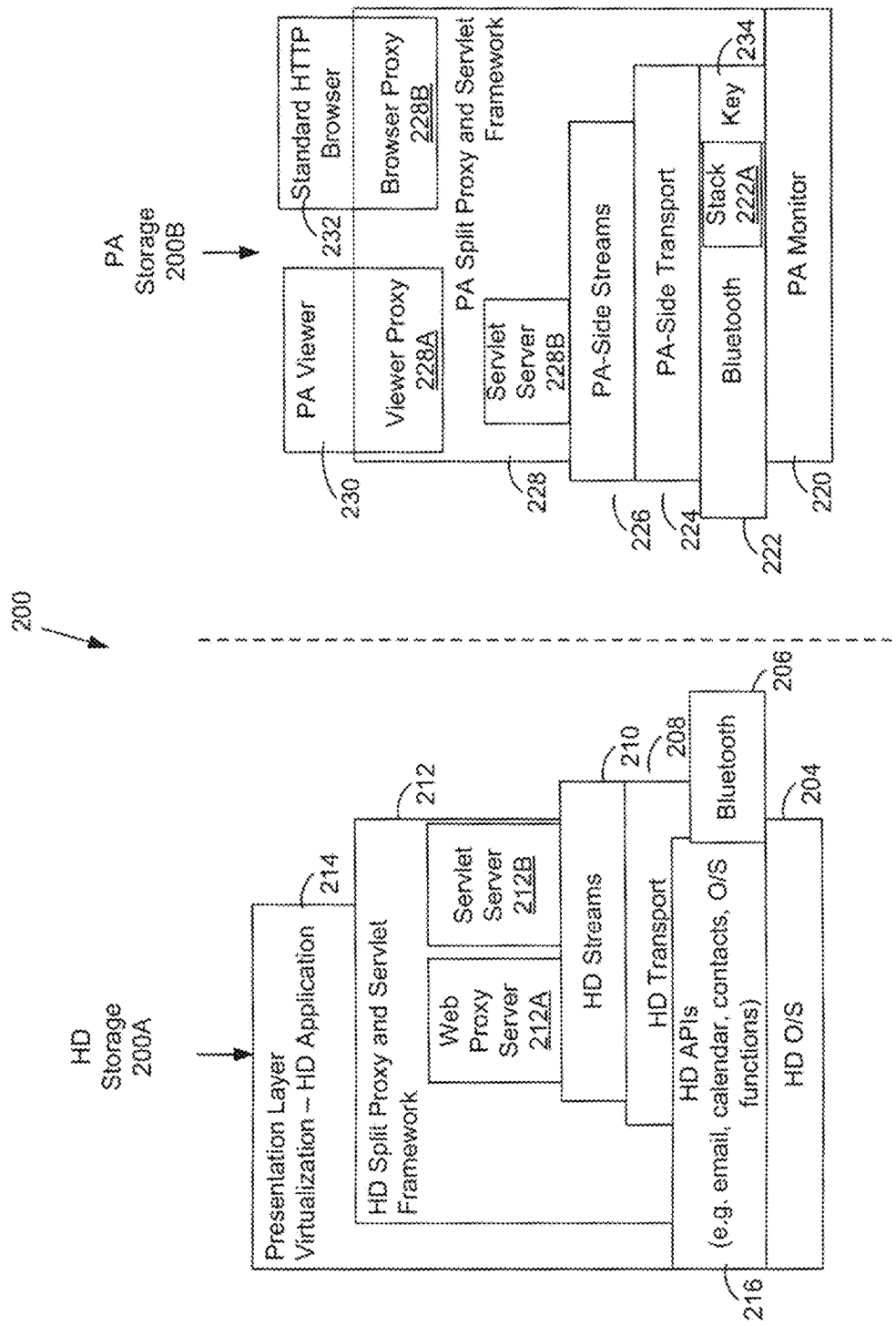
FIG. 2 is a block diagram of respective storage showing a software model for the handheld and presentation appliance.

FIG. 2 is a block diagram of computer storage devices such as memory (200A and 200B, collectively 200) for each of HD 102 and PA 104 illustrating a software component model for carrying out the invention in accordance with one embodiment. HD operating system (O/S) 204 represents native support for device capabilities. In one embodiment, the O/S 204 provides at least the basic services of a Connected Limited Device Configuration (CLDC) which defines the base set of application programming interfaces and a virtual machine for resource-constrained devices like mobile phones, pagers, and mainstream personal digital assistants. When coupled with a profile such as the Mobile Information Device Profile (MIDP), it provides a solid Java platform for developing applications to run on devices with limited memory, processing power, and graphical capabilities. O/S 204 provides APIs for access to rudimentary persistent storage and minimally a Connector architecture similar to J2ME for basic access to Internet Protocol communication functions/services.

The HD Servlet Framework 212 relies on basic event notification methods (e.g. via HD APIs 216) to indicate when events such as new mail has arrived, been deleted, etc. and other events for calendar, contacts, as available, have occurred. Where no event model is available other mechanisms for polling the personal information manager (PIM) stores (not shown) to determine changes would be implemented to emulate events for the PA side.

Presentation Layer Virtualization HD Application 214 (HD Application 214) is a software component that provides functionality and a user interface on the HD 102 to enable the user to establish a communication connection with the PA 104 via coupling 103 and launch the PA Viewer 230. HD Application 214 also allows the user to close down the communication connection, reconnect, exit the application, make HD Application 214 run in the background on HD 102 or request a secure channel between HD 102 and PA 104.

HD Split Proxy and Servlet Framework 212 is a software component that implements the HD-side of a split proxy server and with the PA Split Proxy and Servlet Framework 228 executing on PA 104 facilitates communications between the HD 102 and PA 104. In a preferred embodiment, the split proxy provides an XML-based transport layer (HD Transport component 208) that insulates the higher layer streams-based communications from the complexities of the serial port communications over Bluetooth 206 and provides for highly scalable multiplexing over the single transport. A streams library (HD Streams 210) allows the higher layers to simply read and write data to the other side of the proxy (228) as if it were any other Java stream. This arrangement also insulates the higher layers from the details of whether or not communications over the Bluetooth coupling are encrypted or not. It will be understood that "higher layers" here refers to applications/application layer functions that transmit formatted application data such as in an XML-based protocol for remote presentation or translating presentation/display layer instructions to render a display on the remote PA 104.

HD Split Proxy and Servlet Framework 212 further provides a web proxy server 212A that uses HD Streams 210 and implements:

- a sophisticated TCP socket sharing mechanism to get the most out of the available network connections on the handheld employing connection pooling, keep-alive mechanisms, request pipelining and retransmission capabilities;
- a tunnelling capability that coordinates with the other side of the split proxy 228 for implementing the CONNECT method in accordance with the HTTP 1.1 protocol for use with browser-based applications and other PA-side applications requiring that the split proxy pass data through to the target server without inspection—i.e. reliably tunnelling opaque data that may or may not be encrypted;
- full support for the HTTP 1.1 protocol in coordination with the PA side of the split-proxy 228. PA side 228 performs headers processing before transmitting to the HD side to optimize requests to the HD side and reduce the amount of HD side header processing. Hints are provided to the HD side on whether or not to open a new connection or attempt to reuse a connection for the same endpoint. Further, the PA side is preferably configured to filter and deny requests for certain known bandwidth intensive applications/user agents over the HTTP connection (e.g. Skype, MSN, etc.).

HD Split Proxy and Servlet Framework 212 also provides a Servlet Server 212B that uses the HD Streams library 210. The Servlet Server 212B:

- determines whether requests to the HD over the streams 210 are for local resources/servlets (resources on the handheld) or are to be relayed to Intranet/Internet resources via the web proxy server;
- implements a thread pool to ensure a controllable limit on the number of threads that are being executed on the handheld within the servlet server to accommodate connection limitations to the wireless network and limit resource overload exceptions; and,
- provides a servlet framework for adding custom components that take advantage of the entire servlet server framework by sub-classing the servlet class and coding incremental functionality as if it was a typical "native" HD software component.

HD Split Proxy and Servlet Framework 212 also provides a selectively operable security layer that, when "turned-on" extends encrypted communications to the PA-side split proxy 228.

As discussed further below with reference to FIGS. 4B and 5, in the preferred embodiment, the security capability securely obtains a private key and a third-factor authentication token from a trusted server either in the enterprise or on the Internet. Once the private key is received, HD Split Proxy and Servlet Framework 212 informs the PA Split Proxy and Servlet Framework 228, either manually via the user or by programmatically passing the token, that it 228 is to request the same key by providing the token to the key server. Once the PA Split Proxy and Servlet Framework 228 has received the key it informs the HD Split Proxy and Servlet Framework 212 and all communications thereafter are encrypted using the private key at the transport layer 208 such that higher layers need not be aware that the data is being encrypted and decrypted.

The PA Split Proxy and Servlet Framework 228 is the other side of the split-proxy and shares code in common with the HD Split Proxy and Servlet Framework 212 and coordinates on the implementation of HTTP 1.1. When asked to do so by the HD Split Proxy and Servlet Framework 212. PA side 228 launches the PA Viewer 230 and facilitates communications via transport 224, 208, between the PA Viewer 230 and HD 102.

PA Split Proxy and Servlet Framework 228 monitors the connection with the key tunnel 234 and if the tunnel breaks the PA Viewer is immediately closed. The tunnel is broken when: 1) HD 102 goes out of range of Bluetooth short range communications; 2) the HD user turns off the connection from the handheld via the HD application 214; 3) the HD user directly turns off the Bluetooth connection 206; or 4) any time the Bluetooth flash drive is pulled from the PA 104.

PA Split Proxy and Servlet Framework 228 provides two proxies: a viewer proxy 228A to the PA Viewer for HD application virtualization and a Browser Proxy 228B to any Internet browser such as Mozilla Firefox® or Microsoft Internet Explorer for full web browser functionality. Viewer Proxy 228A is built atop of the same streams library (PA streams component 226) as the HD-Side split proxy 212 code (i.e. HD Streams 208) and thus built atop the same XML transport (PA Transport component 224) over Bluetooth 222 as the HD-Side code 212. Viewer Proxy 228A exposes the application programming interfaces (APIs) 216 of the native HD applications to the PA Viewer application 230 via XML. HD APIs 216 preferably include APIs for email, calendar and/or address book/contacts, among others, provided by data communication application(s) on HD 102. Such data communication applications (not shown) on HD 102 are often synchronized to a user's LAN 112 user account, for example, on email server 118.

As noted, Browser Proxy 228B provides a configurable HTTP 1.1 proxy interface to standard Internet browsers, e.g. 232. As such, it provides wireless access to the Internet (either "bound" via handheld device enterprise server 116 and in accordance with any restrictions and/or traffic monitoring it may impose or "open" without restrictions and typically bypassing server 116, which in one embodiment may include a BlackBerry Enterprise MDS server) for the Browser 232 by translating and relaying HTTP requests to the HD Web Proxy Server 212A over the transport (224 and 208). Browser Proxy 228A portion of PA Split Proxy and Servlet Framework 228 is configurable to allow the user or IT personnel to deny certain user-agents, such as Skype, MSN or other agents that may be undesirable to have access the split proxy services.

PA Viewer 230 is a client-like application providing a user interface to the coupled HD APIs 216. PA Viewer 230 renders a graphical user interface driven by XML presented to it by the HD application 214 and HD split proxy 212. In one embodiment, PA Viewer 230 is a Windows .NET based application. PA Viewer 230 presents the user of PA 104 an interface for manipulating the data being displayed and for sending requests back to the HD side 212 for HD APIs 216. A representative view is described below with reference to FIG. 3.

PA Monitor 220 is an application that enables the user of PA 104 to launch all of the PA side components (222-234) in a coordinated fashion and to monitor their status. If any component fails, for example, because communication with HD 102 is interrupted, the PA monitor 220 notifies the user and provides remediation instructions where possible. In addition, as described above, PA Monitor 220 attempts to close the PA Viewer 230 gracefully in the case where the key tunnel 234 is seen to be "down". In one embodiment, PA Monitor 220 is a Windows .NET-based application.

Key tunnel 234 comprises a "lightweight" software component that executes on PA 102 and serves as a simple tunnel between the Bluetooth 222 component's stack 222A and PA Split Proxy and Servlet Framework 228. Key tunnel 234 reports connectivity status via the standard output stream of the process and shuttles data back and forth between the stack 222A and the PA Split Proxy and Servlet Framework 228. On one side of the tunnel the data is read and written over a serial port (com port) interface to the Bluetooth stack 222A and on the other side it is a TCP connection to PA Split Proxy and Servlet Framework 228.

As described previously, a combined USB/Bluetooth Dongle and flash drive 103A may be configured for coupling to PA 104 to provide executable components as well as Bluetooth communication capabilities. The combined unit can enable the use of a consistent Bluetooth interface and stack for communication components (e.g. Key tunnel 234) on PA 104 rather than depending on any Bluetooth capabilities native to PA 104).

Figure 3:
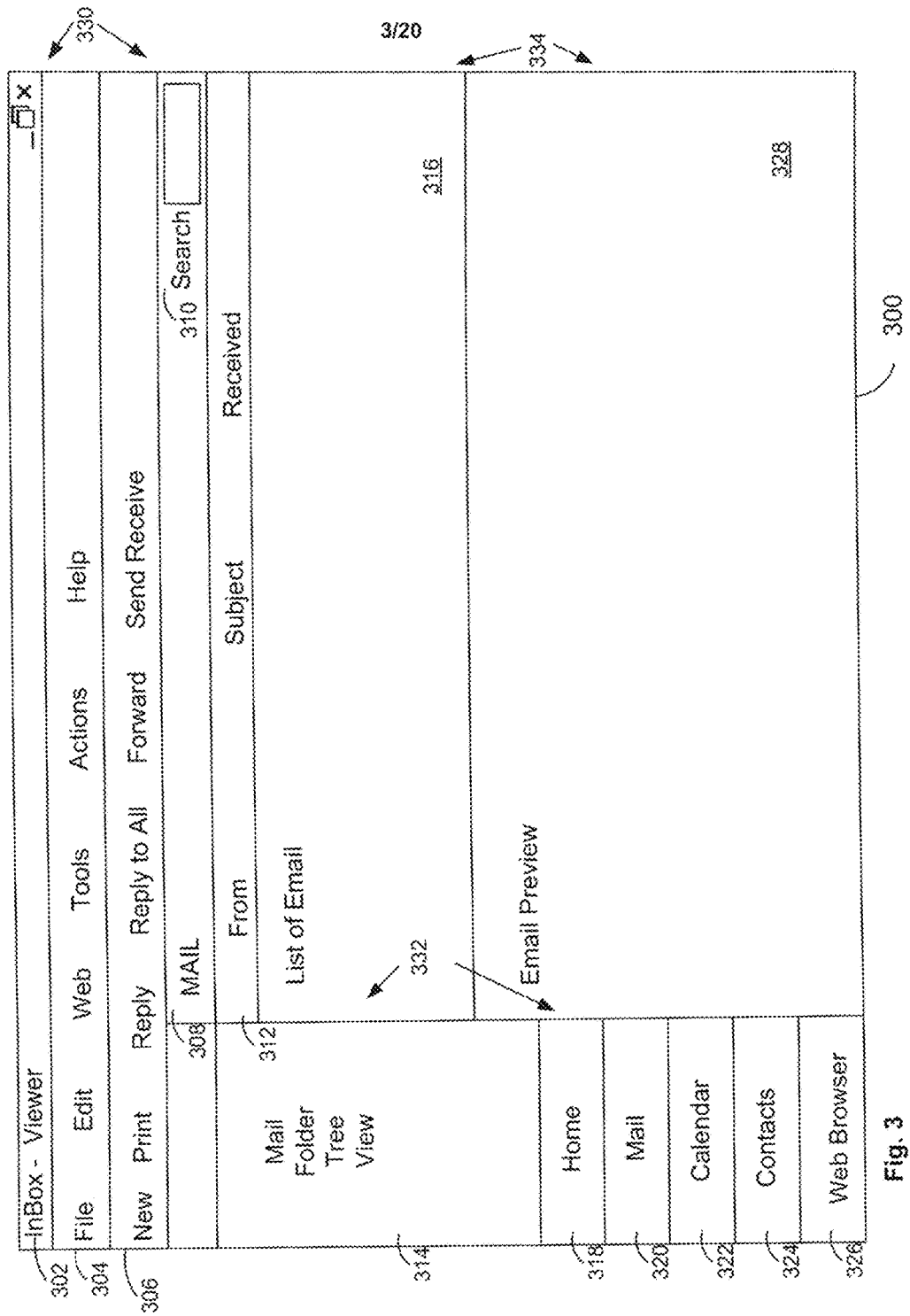
FIG. 3 is a representative user interface screen view of a presentation layer viewer in accordance with one embodiment.

FIG. 3 is a representative user interface screen layout 300 of one embodiment of PA Viewer 230. View 300 shows a representative illustration of an email user interface, similar to a desktop user interface experience, including three primary portions, namely upper toolbar area 330, and two lower portions for controls 332 and a main data display area 332. Toolbar area 330 includes a title portion 302 and one or more toolbars (e.g. 304, 306, and 308). A particular toolbar may be contextual to the active user interface being rendered. For example in toolbar 308 for presenting the HD's email application, a search interface 310 is contextually provided to search email. Controls 332 may include a contextual interface for exploring or manipulating data displayed in main data display area 332. For example, a folder hierarchy or tree view 314 may be provided for exploring mail data as is well known. In a calendar view mode (not shown), calendar months may be displayed. In a Home view (not shown), status information concerning the HD (e.g. wireless signal, battery life, owner, etc.) HD to PA connection status, among information may be shown. Controls (e.g. radio or button style user inputs) therein can be provided for control aspects of the HD-PA presentation layer virtualization experience. One example includes a control to specify whether to use the HD connection for web browsing or another connection available to PA 104.

Controls 318-324 provide convenient interfaces to invoke the display of particular data in main data display area 334 or (e.g. 326) to launch external user interfaces such as web browser 232.

Main display area 334 may be divided into more than one portion such as in the Mail view 300. View 300 shows a list of email comprising summary data in upper portion 316 and individual email previews including a portion of the specific email's body, if applicable) in lower portion 328. Selecting a particular email may open the email in a separate pop-up window as is well known. Though not shown, a calendar view or contacts view may not divide the display area and show all data in an undivided portion of the area 332. Like other user interfaces, PA viewer 230 may be navigated using a pointing device and/or keyboard input to move among the controls, select control and invoke actions. Clicking on a "new" control of toolbar 306 may invoke an email composition pop-up window for example.

Importantly, PA Viewer primarily obtains its data for mail, contacts, calendar, etc. from data stored to HD 102 or otherwise available to HD 102. Due to the limited resources (e.g. storage and bandwidth) of HD 102, an HD user may have only a subset of the user's email stored to HD 102. More email data may remain available to the user through email server 118, for example via a different email interface such as through Outlook or Web mail on a desktop computer (not shown). Often, only a portion of a particular email is stored on HD 102. The associated HD application may permit selective retrieval of more data (e.g. via a More or More All command interface). PA viewer 230 preferably offers similar functionality.

A virtual file system is preferably provided by the respective split proxy and servlet frameworks 212 and 228. Such a file system assists with the organized transfer of data/files particularly between PA 104 and HD 102. In accordance with a first model for moving data/files from PA 104 to HD 102:

(a) Files to be transferred from PA 104 to HD 102 for storage on HD 102 or for subsequent attachment to an outbound email are first stored to a root directory on PA's removable storage 103A (i.e. combined flash drive and Bluetooth dongle) similarly to how any other application would save a data file to any other file system. As storage 103A is removable, no data remains on PA 104 even in the case where the file may not be successfully transferred to the HD 102;

(b) PA Viewer 230 then sends an XML-based request to the HD Servlet Server 212B containing as part of the payload a relative URL to the resource stored on dongle 103A. For example res:///path/filename;

(c) When HD Servlet Server 212B processes a request that contains an element with a URL as indicated in (b) above it makes a request back to the PA Servlet Server 228B using the URL provided;

(d) The res::// scheme indicates that the response is to be treated as a raw binary stream and the virtual stream is closed when all of the data of the file is returned;

(e) In the case where the resource is to be attached to an email, it is incorporated into the construction of the email using the HD APIs 216;

(f) In the case where the resource is to be saved to HD storage for subsequent manipulation through other applications (either on HD 102 or the PA 104) the data is stored to HD's persistent storage via the HD APIs 216;

(g) The resource is removed from the PA storage 103A.

Figure 6:
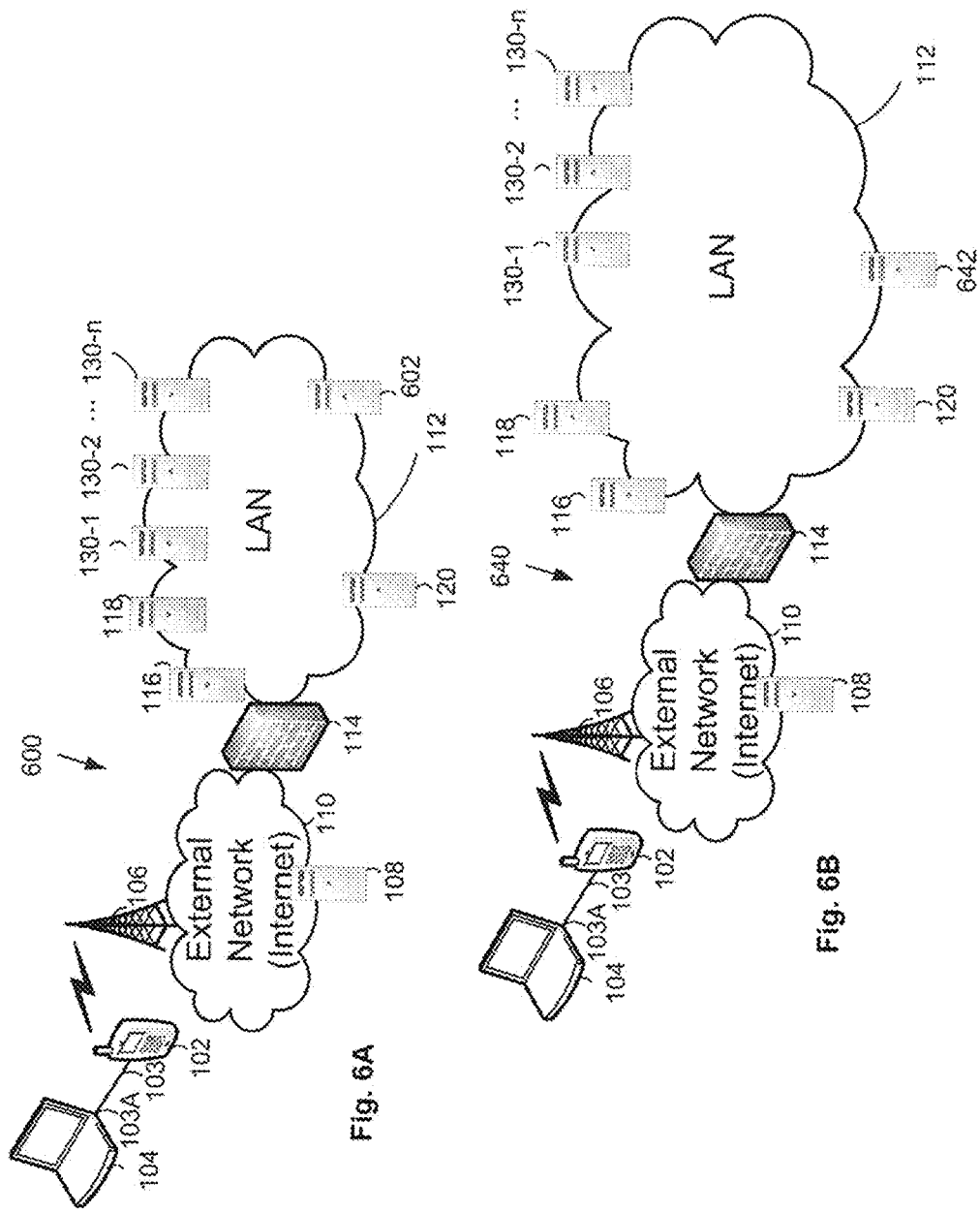
FIGS. 6A and 6B are respective alternative embodiments of communication network of FIG. 1.

In accordance with a second model for transferring data/files from PA 104 to HD 102 but in a secure manner, similar operations are undertaken as described with reference to the first model. However, for those cases where it is not acceptable to have a resource saved transiently and insecurely to storage 103A:

(a) The resource is encrypted using the same key as obtained to secure the communications transport between HD 102 and PA 104 (as described with reference to FIGS. 4B and 6)—therefore it is indicated when the end-to-end secure transport is enabled;

(b) The same URL (e.g. res:///path/filename) is sent to the HD Servlet 212B;

(c) The resource is pulled from the PA Servlet 228B server as in the first model above;

(d) The resource is decrypted using the secure key;

(e) The resource is either saved to HD 102 and/or sent as an email attachment in the same way as described above.

In the case where files are stored to dongle 103A in an encrypted form, if the data is not completely transmitted to the HD and decrypted before the session is stopped, the file will not be able to be decrypted again unless a key history is stored (for example, on the HD storage). A timestamp of the encrypted file on the dongle 103A may be used to index into a key history to determine the appropriate key for decrypting the file after retrieving it from PA storage 103A.

The virtual file system may provide two or more partitions for data storage. One partition may be a USB connected removable media that can be mounted by any standard operating system's file system and may be accessible by third-party applications, as is known to those skilled in the art. A second may be a file system that can only be mounted using the split-proxy server of the present invention. The two or more partitions could be implemented on the same flash storage drive. Alternatively, the partitions can be implemented on distinct flash storage drives.

Figure 12:
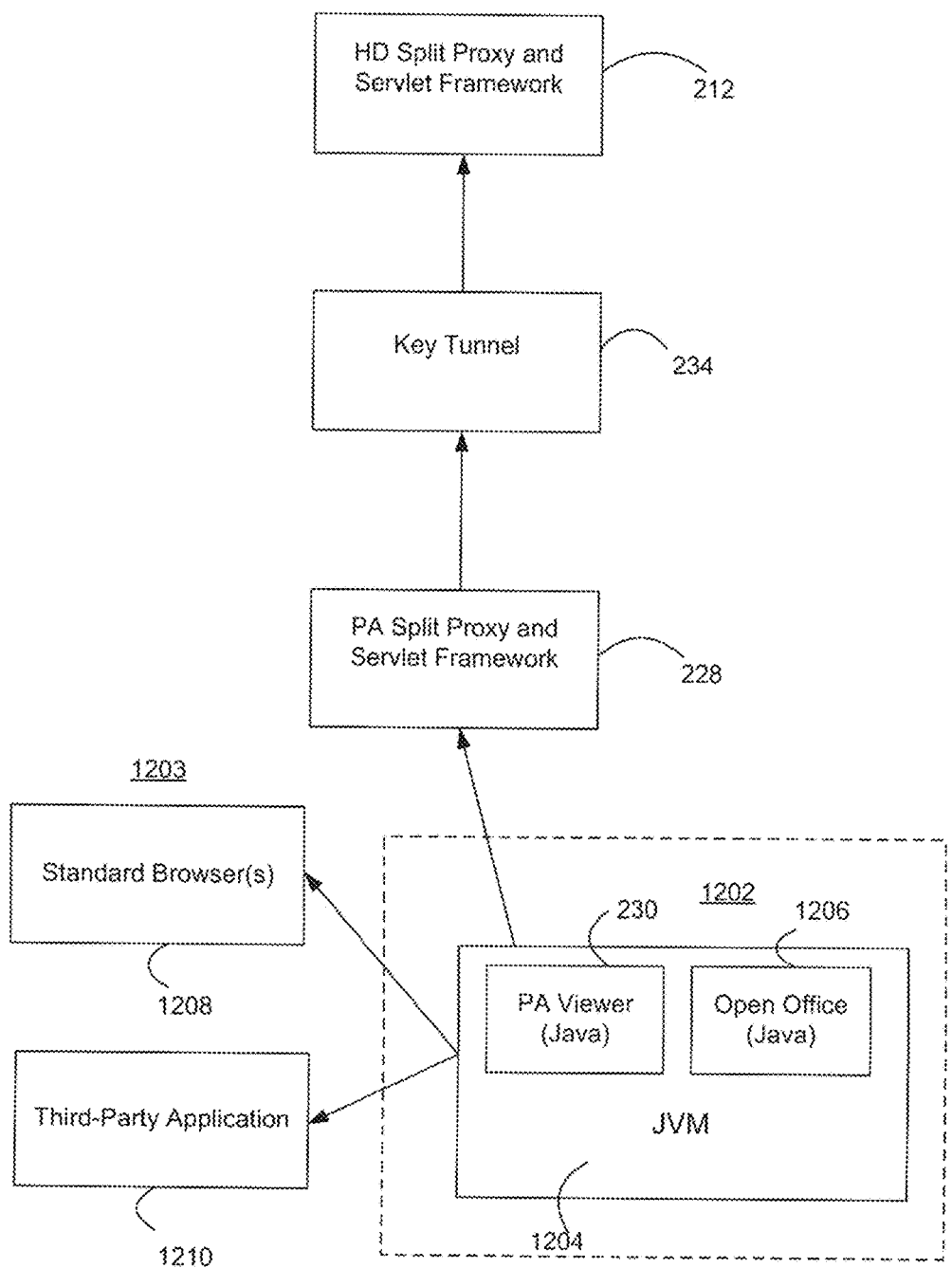
FIG. 12 is a block diagram of one embodiment showing execution of applications in a contained execution environment or container comprising a virtual machine.

In one embodiment, with reference to FIG. 12, the runtime environment comprises two zones 1202, 1203. The PA Viewer 230 application is written in a language (e.g. Java) such that in the first zone 1202 it can reside within the same execution environment or operating container 1204 (e.g. a Java Virtual Machine) as third-party applications 1206 written in that same language, which the PA Viewer 230 also uses to render attachments and other data. Third-party applications 1206 used by the PA Viewer 230 can be restricted by the policies and other configurations of the container 1204, which also contains the PA Viewer 230, as determined by the enterprise. As an example this container zone could be implemented as a Jar file in the case that the language is Java and the container is a Java Virtual Machine. The second zone 1203 includes a file system mountable by any standard operating system's file system and may be accessible by third-party applications 1210 that do not reside in the container and which are not subject to the enterprise's policies and configurations as is the first zone 1202. Uncontained applications (e.g. standard browsers 1208) and container 1204 can operate with the PA Split Proxy and Servlet Framework 228 and HD Split Proxy and Servlet Framework 212, which in turn utilize the Key Tunnel 234 as explained above.

Figure 13:
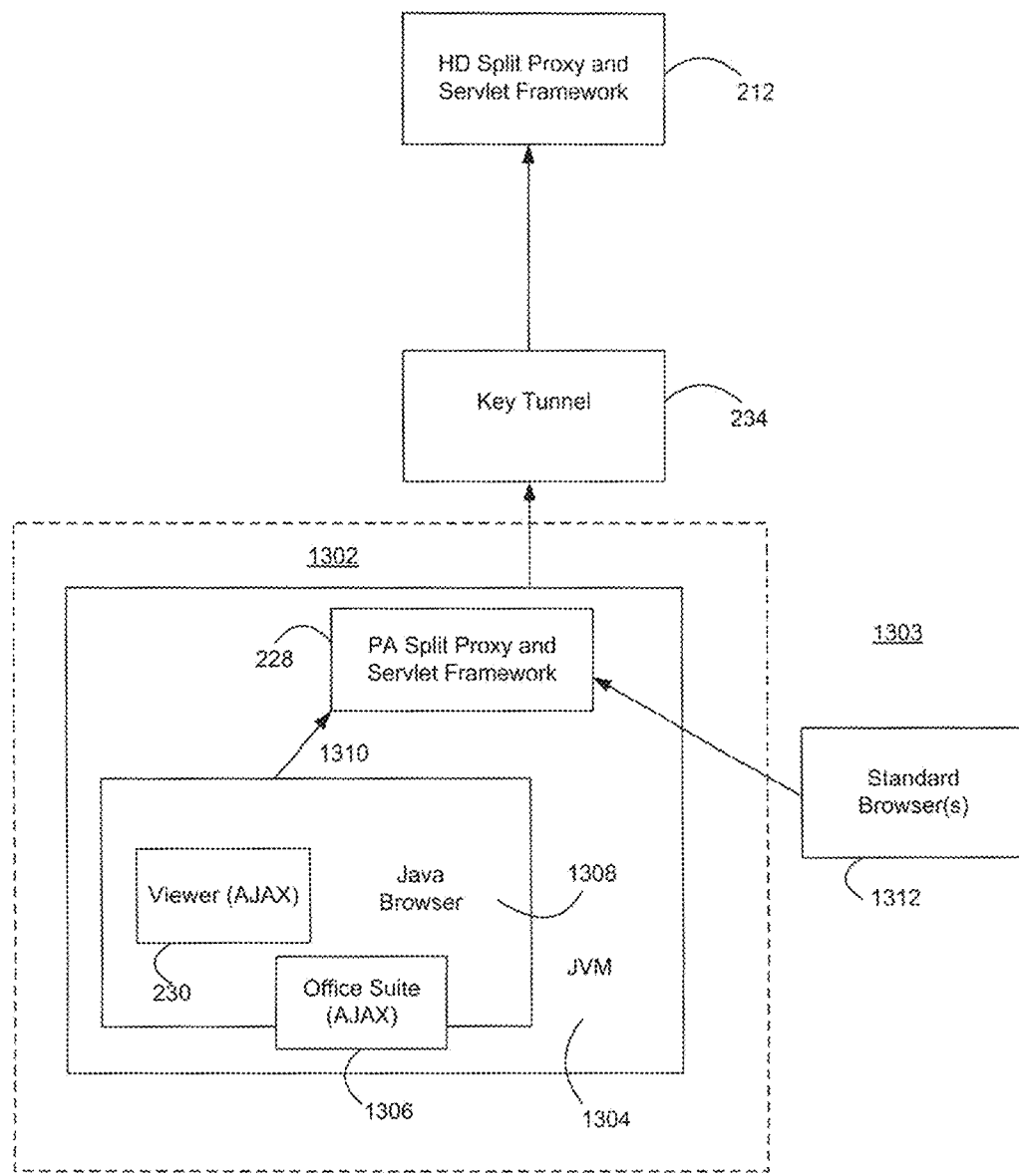
FIG. 13 is a block diagram of another embodiment showing execution of applications in a contained execution environment or container comprising a virtual machine.

In another embodiment, shown in the block diagram of FIG. 13, two zones 1302, 1303 are also provided. The Viewer 230 application is written in a language (AJAX or JavaScript for example) such that in the first partition 1302 it can reside within the same operating container 1304 (e.g. a Java Virtual Machine) as third-party applications 1306 (e.g. Office Suite) written in that same or a compatible language (e.g. AJAX or JavaScript), which the Viewer 230 also uses to render attachments and other data. An application 1308 (e.g. a Java browser) in the container and the Viewer 230 can share the same authentication information such that the browser is permitted to access enterprise resources by using the split proxy (212, 228). For example, a Java browser 1308 residing within the same container 1304 as the PA Split Proxy and Servlet Framework 228 can provide the authentication information in an HTTP request header 1310 to the PA Split Proxy and Servlet Framework 228, and thereby be granted access to the enterprise resources through the Key Tunnel 234 and the HD Split Proxy and Servlet Framework 212. However, an application 1312 in the second zone 1303, i.e. not in the container 1304, will not have access to the authentication information available in the container 1304 and will not be permitted to access the enterprise resources (because it will be unable to provide proper authentication information) using the split proxy 228.

In the above two embodiments (shown in FIGS. 12 and 13) the Viewer 230 may be programmed using a language compatible with (and residing in the same container with) a third-party application it uses to render attachments and other data on a handheld device.

Figure 14:
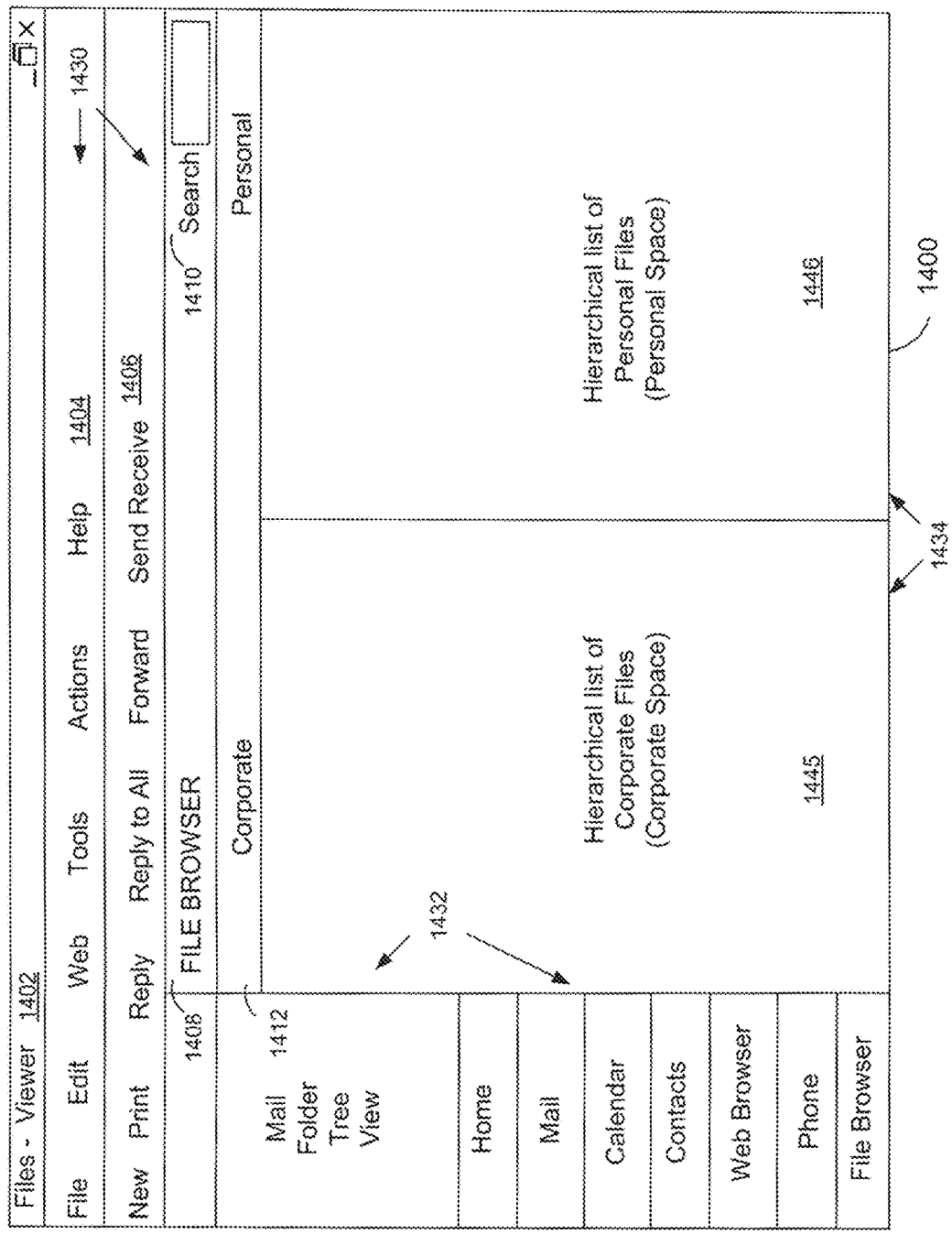
FIG. 14 is a representative user interface screen layout in accordance with one embodiment.

FIG. 14 is a representative user interface screen layout or view of one embodiment of the PA Viewer 230 in operation in which a memory partition is incorporated. View 230 shows a representative illustration of a file system user interface, similar to a desktop user interface experience, including three primary portions, namely upper toolbar area 1430, and two lower portions for controls 1432 and a main data display area 1434. Toolbar area 1430 includes a title portion 1402 and one or more toolbars (e.g. 1404, 1406 and 1408). A particular toolbar may be contextual to the active user interface being rendered. For example toolbar 1408 for presenting the HD's file browser application, a search interface 1410 is contextually provided to search files in the file browser. Controls may include a contextual interface for exploring or manipulating data displayed in the main data display area 1434, as explained with reference to FIG. 3 above.

The main portion 1434 of the view 230 shows the visual separation of the file system into the Corporate Space 1445 and Personal Space 1446. Files (data) in the Corporate Space cannot be copied to or saved to the Personal Space (e.g. by drag and drop, cut/paste etc.), but files in the Personal Space can be saved or copied into Corporate Space. Third party applications, residing outside of the container will likewise not be permitted to access files in the Corporate Space.

Figure 15:
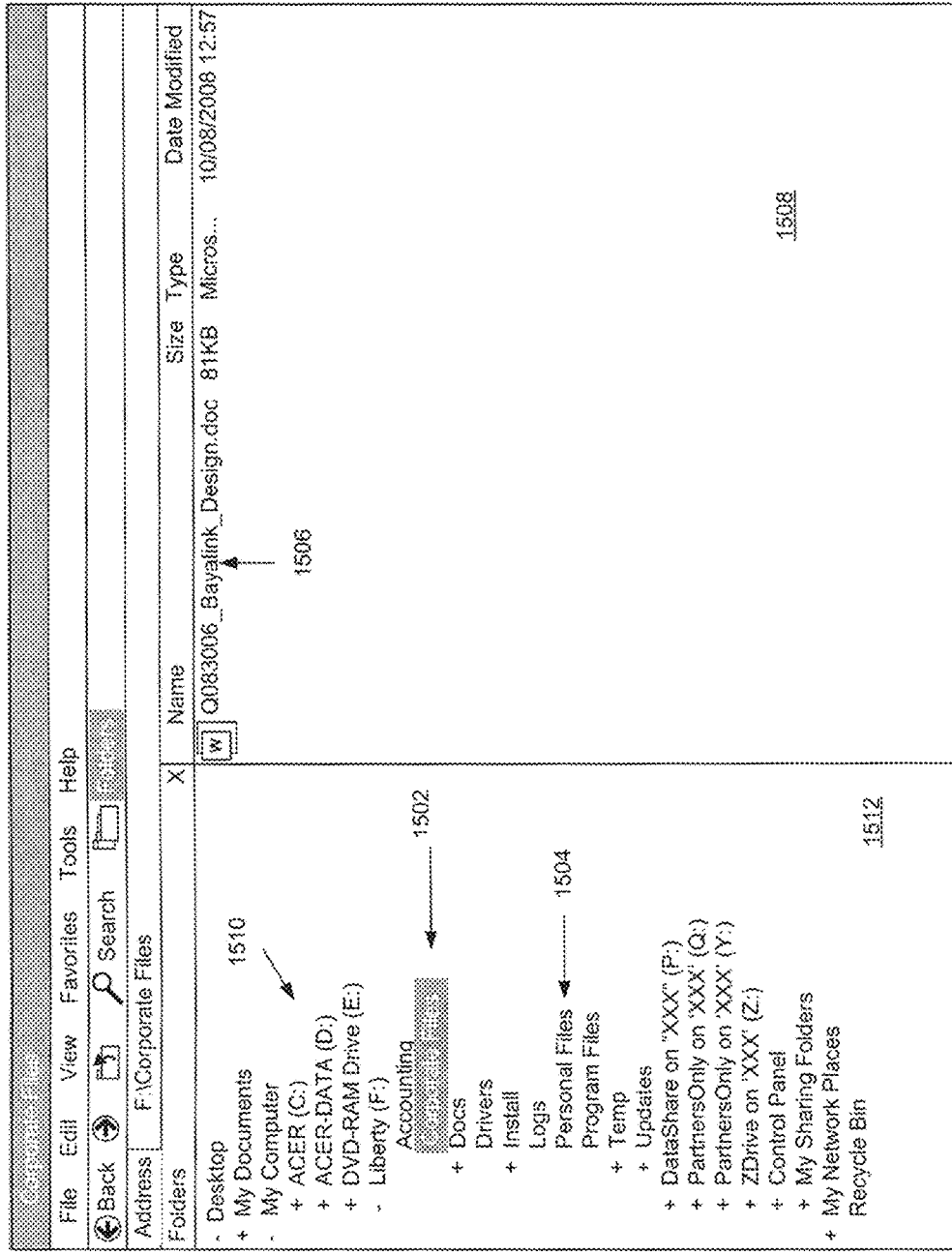
FIG. 15 is a representative user interface screen layout of one embodiment of the file system.

FIG. 15 shows a screen shot of one embodiment of the file system in operation on PA Viewer 230. Using Microsoft Windows' File Explorer software (for example), the user can easily navigate to the files on the HD. The Corporate Space (folder 1502) and the Personal Space (folder 1504) are clearly distinguishable. Any files (e.g. 1506) present in the Corporate Space (folder 1502) may be shown in the display panel 1508 (e.g. when a focus is on the folder 1502). The directory tree 1510 is provided on another display panel 1512, which can be visible in the same window 1514 as display panel 1508. Should a user attempt to access files in the Personal Space (folder 1504) (e.g. via File Explorer software) the user would be presented with the appropriate application for the type of file being accessed (not shown).

Figure 16:
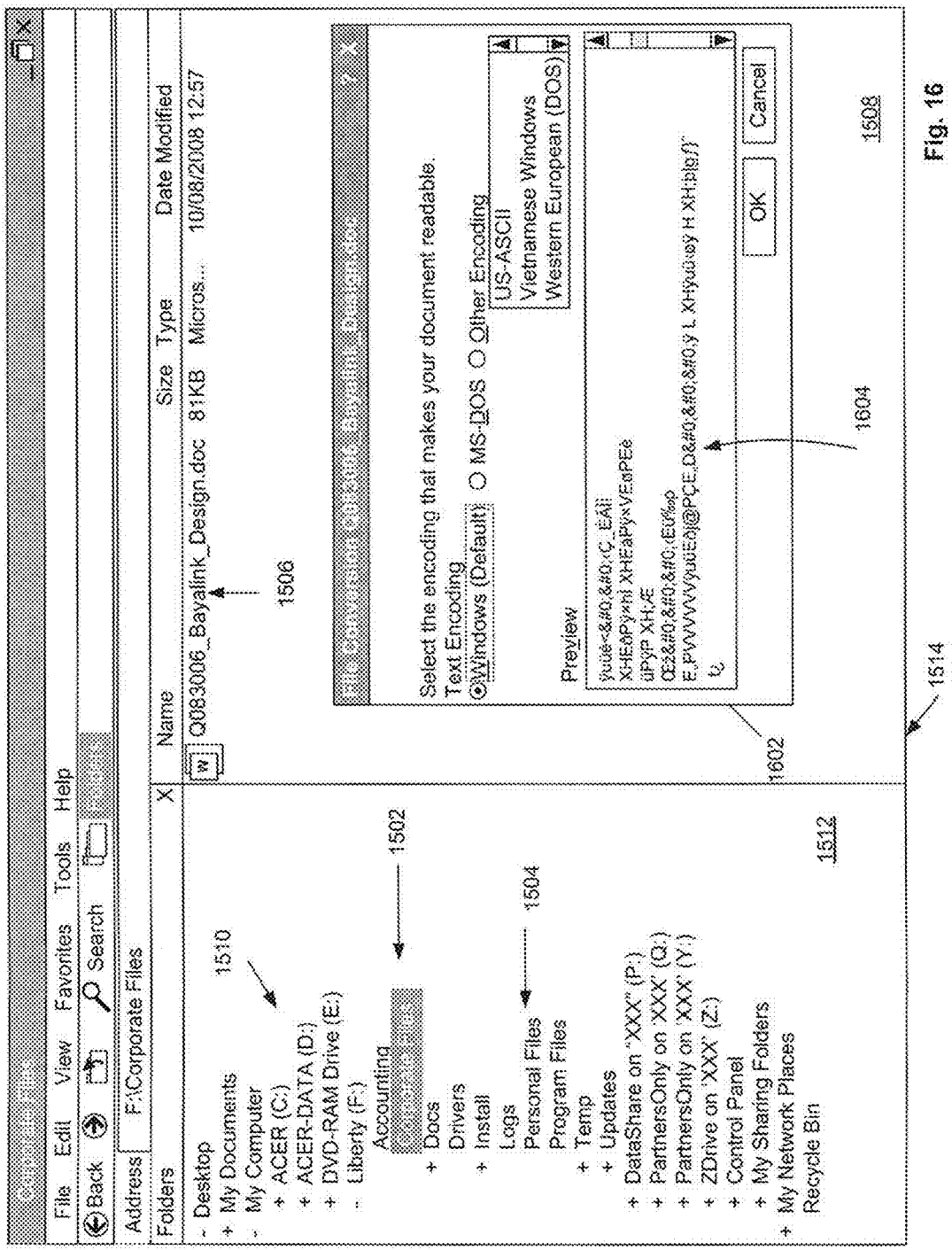
FIG. 16 is a representative user interlace screen layout of another embodiment of the file system.

FIG. 16 is a screen shot showing example results when a user attempts to open an encrypted file 1506 residing in the Corporate Space (folder 1502) in a situation in which the user's File Explorer software does not reside in and does not have access to the container. Because the user's file explorer software does not reside in the container it is not able to decrypt files within the Corporate Space (folder 1502). As a result, the file 1506 is displayed 1602 in its encrypted form 1604.

Alternatively, the flash storage structure can be configured so that the Corporate Space (folder 1502) does not appear to applications outside of the container, (such as to Windows' File Explorer program local to the PA (not shown)). This can be accomplished by: 1) establishing an entire flash drive on the HD as a Corporate Space, 2) not allowing the Corporate Space to be used in mass storage mode and 3) by writing data to the Corporate Space through the split proxy infrastructure back to the HD using a proprietary protocol (VFS) such that the file system is not recognized by standard file system viewers like Windows' File Explorer.

Figure 17:
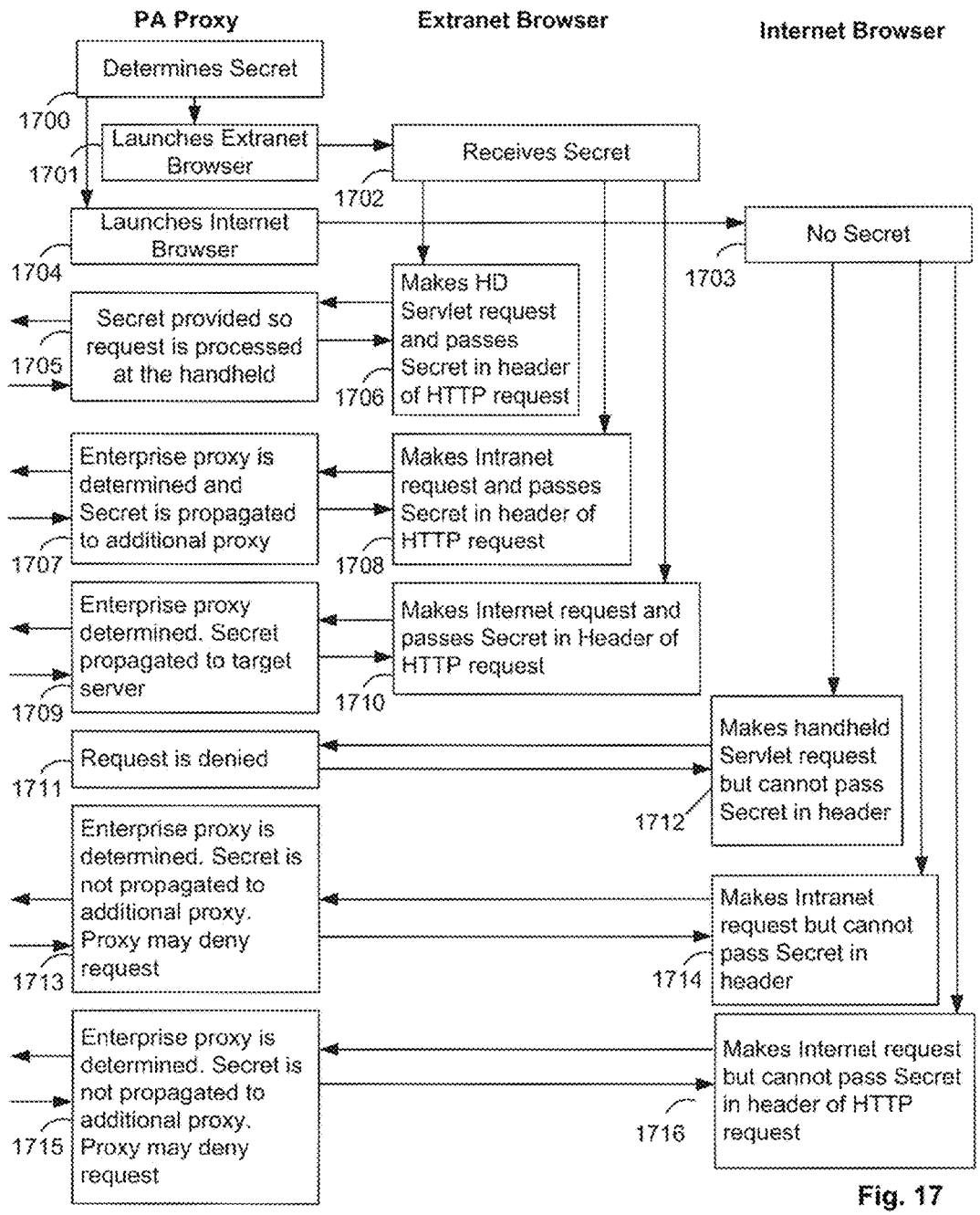
FIG. 17 is a flowchart of initialization and operation of applications in accordance with a contained execution environment embodiment.

Similarly, if one browser resides in the container ("Extranet Browser") and a second browser resides outside of the container ("Internet Browser") only the Extranet Browser will be able to access enterprise resources. FIG. 17 shows a flow chart of an example of such a scenario where both browsers are launched. In practice a user may only launch one or the other browser.

Referring to FIG. 17, the PA Split Proxy 228 determines the enterprise authentication information from the HD Split Proxy 212 (step 1700). A user then launches two browsers (steps 1701 and 1704) on the PA Split Proxy 228: an Extranet Browser and an Internet Browser. The Extranet Browser is coded within the same container (e.g. in the same JVM) as the PA Viewer 230 and can be subject to the same restrictions and configurations dictated by the enterprise as the PA Viewer 230. The Internet Browser is not within the same container as the PA Viewer 230. The PA Split Proxy 228 passes the authentication code to the Extranet Browser when it is launched (step 1702); no such authentication code is available to the Internet Browser (step 1703) because it is not within the same container as the PA Viewer 230 in the PA Split Proxy 228.

When the Extranet Browser makes a request for a servlet running on the HD (step 1706), the authentication information is corroborated at the PA Split Proxy 228 and the request is processed (step 1705) at the HD Split Proxy 212. If the user attempts to make a servlet request to the handheld from the Internet Browser (step 1712) (which may not be in the container), the authentication information cannot be provided by the browser and consequently the request is denied (step 1711) at the PA Split Proxy 228. When the Extranet Browser requests Intranet resources, the authentication information is passed to the PA Split Proxy 228 in the header of the HTTP requests using methods known to those familiar with the protocol. The PA Split Proxy 228 infrastructure is invoked and the authentication information is propagated to the target server, whether that being an additional proxy server (steps 1707, 1708) or the actual target intranet server providing the resource (steps 1710, 1709). The use of an additional proxy server is explained in detail below. The target server would then either check for the authentication information in the HTTP request header and deny the request if the authentication information is not present or, alternatively, validate the authentication information against a database of registered authentication data (which can be provided by the container at initialization 1700, for example).

Alternatively, at the time of determining the additional proxy (referring still to FIG. 12), the PA Split Proxy 228 could determine whether the additional proxy is designated as an intranet proxy (i.e. for accessing enterprise data or applications) or an Internet proxy (not shown). If it is an intranet proxy, the PA Split Proxy 228 would deny the request if the authentication information did not corroborate. A server-side component could be employed to help determine between intranet and Internet addresses (for example, for determining whether the determination is made at the server or whether a dynamic list of domains is pushed to the container). The enterprise could further restrict access to certain Internet domains based on the authentication information being present or corroborated.

The use of removable/upgradeable micro storage such as microSD cards and others is common in order to separate the purchase of storage from the purchase of a handheld device. The benefit that this provides is that storage can be upgraded, from 4 GB to 32 GB for example, while continuing to use the same handheld device. New wireless communication devices such as the iPhone™ and the BlackBerry Bold™ are also sold with non-removable flash storage. One of the benefits of this non-removable additional storage is that larger amounts of data can be pushed or pulled to the wireless communication device and reside in this storage while still being controlled by the enterprise via the mobile infrastructure (e.g. BlackBerry data can be remotely deleted by the enterprise). Additionally, this storage may or may not be addressable/readable by standard USB connected mounts on PCs (or Mac, etcetera). For example, BlackBerry has the ability (e.g. through IT policies) to disable the wireless communication device from showing this internal storage as a standard drive (e.g. Mass Storage Mode Off) when the wireless communication device is plugged in to a PC/laptop via USB cable. In some scenarios it is desirable to make removable storage additionally available, on any endpoint, for both corporate and personal data while preserving the security of the corporate data.

Derivative challenges are created when data is originated at the endpoint and is encrypted on the HD store, or example, as described with reference to FIGS. 12-13 above. It is often desired and in some enterprise contexts required that data backed up for recovery purposes. Further it is desired to scan data for viruses—data originated at an un-trusted endpoint could have viruses within the data and so it recommended to scan the data before being accepted behind an enterprise firewall e.g. for others to open on legacy desktop platforms such as Microsoft Office. It is cumbersome to backup and scan encrypted data. Keys etc. must be shared and backed-up/maintained.

In accordance with a further embodiment, the HD and PA may be configured to provide access to file systems (e.g. within microSD or other onboard storage) when Mass Storage Mode is off enabling reading and writing to the HD yet enforce that no data from the HD is left on the PA.

Figure 18:
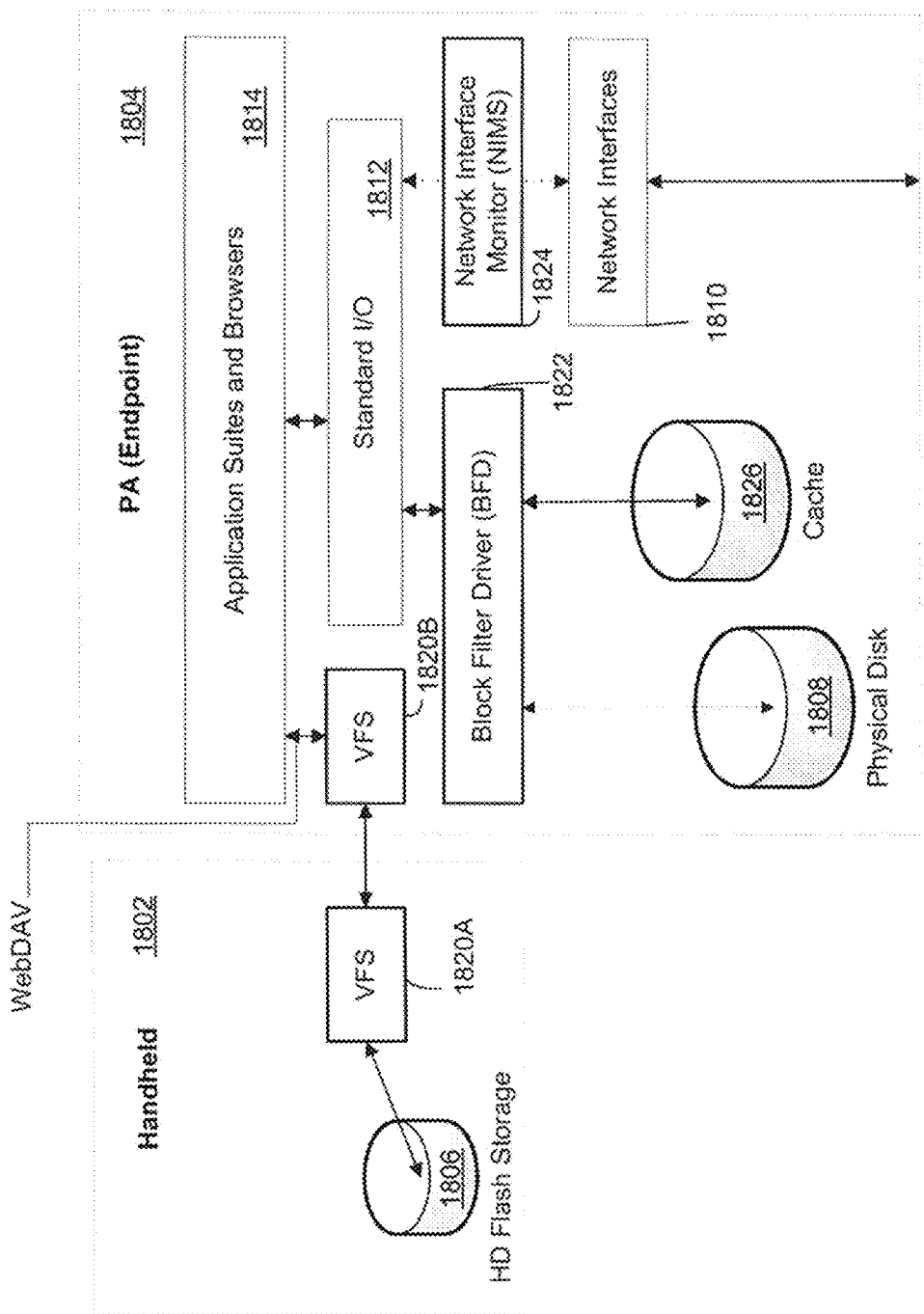
FIG. 18 is a block diagram of a further embodiment of a coupled handheld and presentation application configured such that the endpoint presentation appliance may read and write data to a store on the handheld yet no data is left on the presentation appliance.

FIG. 18 is a block diagram of a further embodiment of HD 1802 and PA 1804 configured such that an endpoint PA 1804 may read and write data to a store 1806 on the HD yet no data is left on the PA (e.g. to endpoint store 1808). A data containment environment is provided for applications on the PA restricting such from storing data, other than transiently, or communicating data from the PA other than via the virtual file system. Persons of ordinary skill in the art will appreciated that only selected physical and software components are illustrated in FIG. 18.

PA 1804 comprises a physical store 1808 (such as a hard drive, flash, optical disk writer etc.), a network interface(s) 1810 providing access to a LAN or public network (not shown), standard I/O 1812 and a plurality of applications 1814 such as suites and browsers. Typically, these applications 1814 are configured to store data using a standard I/O 1810 service to physical media such as 1808. Some may be configured to access resources using interface 1810. HD 1802 comprises storage media 1806 such as a non-removable flash or removable flash (microSD or other format). In accordance with the present embodiment, HD 1802 and PA 1804 are configured to securely communicate via a split proxy and virtual file system as described with reference to FIG. 2 and as adapted as described below to provide WebDAV access to store 1806. For convenience, the components of such described above are simplified as virtual file system (VFS) components 1820A and 1820B. WebDAV or Web-based Distributed Authoring and Versioning, is a set of extensions to HTTP that allows users to collaboratively edit and manage files on remote World Wide Web servers. Microsoft™ and Apple™ operating systems provide WebDAV client support for file explorers (e.g. Windows Explorer™ and Mac Finder™).

PA 1804 further comprises a block filter driver (BFD) 1822 and a network interface monitor system (NIMS) 1824. BFD 1822 is configured to filter and trap standard I/O block write requests to a storage device available to the PA (other than via the VFS), directing the blocks to a managed cache 1826 to temporarily store the data. The managed cache may be encrypted. The cache is deleted upon restart of the PA and the PA is restarted at the end of a session. Application requests to read to one or more of the cached blocks are trapped to obtain the data from the cache as necessary or the store 1808 as necessary. In this way, data created when the HD and PA are coupled and operating in communication (i.e. during a "session") cannot be stored to PA 1804 other than transiently and in a manner that is not decipherable without an appropriate index maintained by the BFD 1822. The data cache 1826 may be maintained in memory (e.g. RAM not shown) or to a disk or other store including store 1828.

Standard I/O that is bound for a network connected drive and other network traffic is simply blocked as the NIMS 1824 ensures the network interfaces 1810 remain off while a session is in force so that PA does not communicate other than with HD via the split proxy.

In accordance with the embodiment, VFS 1820A and 1820B enables applications (1814) that support I/O using the WebDAV protocol to access the HD store 1806. As described above, VFS 1820A 1820B provides a server to support servlets which may be configured to provide WebDAV services (e.g. directory listing, properties, creating, deleting, renaming, reading and writing files) such as RPC methods to implement basic file system access in accordance with the WebDAV specification. Rather than providing such access to a file system on PA 1804, the VFS is configured to provide the access to the store 1806 of HD 1802. Applications 1814 performing WebDAV based I/O will find the VFS server 1820A and will be able to manipulate files in the VFS space 1820A, 1806. VFS 1820B uses the WebDAV protocol on the PA 1804 and a proprietary protocol between the two VFS points 1820A and 1820B atop of the split proxy infrastructure between the PA and HD (i.e. proprietary communications over Bluetooth or USB wired connection) to enable the VFS operations. While WebDAV is preferred as it is an accepted specification with numerous commercially available components supporting the specification, other I/O service support components could be adopted including proprietary components.

In accordance with another embodiment to address challenges presented by flash or other storage use on HD, there is provided a network configuration and method for providing a means to store corporate or other sensitive data to a removable store on HD.

Figure 19:
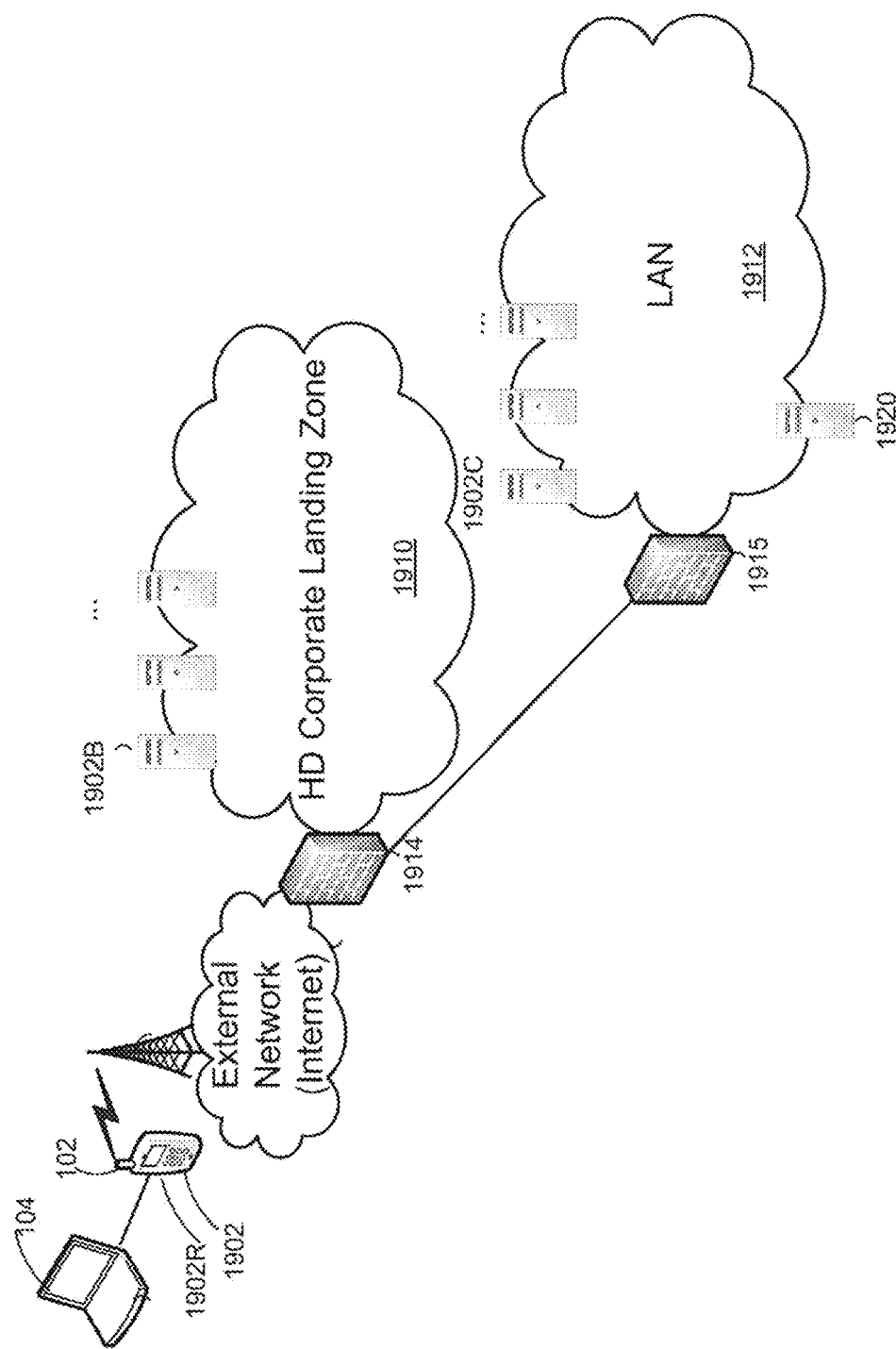
FIG. 19 is a block diagram of an embodiment of a communication network including a corporate landing zone, external to a corporate network, for data from a handheld.

FIG. 19 illustrates a block diagram of an embodiment of a communication network in which a presentation appliance 104 is coupled to a HD 102 having a non-removable store 1902 and a removable store 1902R. HD 102 is coupled via an external network infrastructure (e.g. including a public wireless network and the Internet) to a local network or HD corporate landing zone 1910 behind a firewall 1914. Network 1910 comprises one or more servers 1902B providing personal storage space for storing data from HD 102 as described herein below. Network 1910 is coupled to enterprise LAN 1912 through firewall 1915. LAN 1912 comprises one or more servers 1902C and a server 1920.

Taking advantage of the encryption capabilities within the split proxy solution, data received in unencrypted form and stored to a non-removable storage may be moved to a removable store and stored in encrypted form. Data that newly arrives at the HD (e.g. pushed or pulled from a corporate network) is first stored on the non-removable storage 1902 (in unencrypted form). Only when coupled to PA 104 and in a session is the data on the non-removable storage 1902 accessible to applications on the PA 104.

Once initially read from non-removable storage, the user is given the option to leave the data on the smaller internal storage or transfer the file to the removable storage media 1902R with the contents being encrypted by strong encryption technology (AES for example). This option can be invoked either explicitly with the user taking specific action to move the file to the removable storage 1902R—for example, when prompted when low free space is detected—or implicitly whenever a file from the internal store 1902 is modified and re-saved.

Once transferred to removable storage 1902R the data remains encrypted and therefore is only ever accessible via the secure split-proxy environment—even if the removable storage 1902R is removed and placed in another non-enterprise device (not shown), only personal files that have not been encrypted will be generally accessible via standard means.

Similar to how the handheld is a personal data landing zone for data coming from the enterprise to the user, there is a landing zone 1910 created behind the firewall 1914 but outside of the general corporate network 1912, 1915. In this way data can be backed up from the handheld 102 and transiently stored in a personal space (1902B) within the corporate landing zone 1910 that mirrors the data on the employee's handheld. In this corporate landing zone 1910 data is decrypted, scanned for viruses and propagated on into the corporate network (1902C) to be available for integration into normal backup/recovery processes within the enterprise and for general access to others within the corporate network 1912 (e.g. server 1920).

Figure 20:
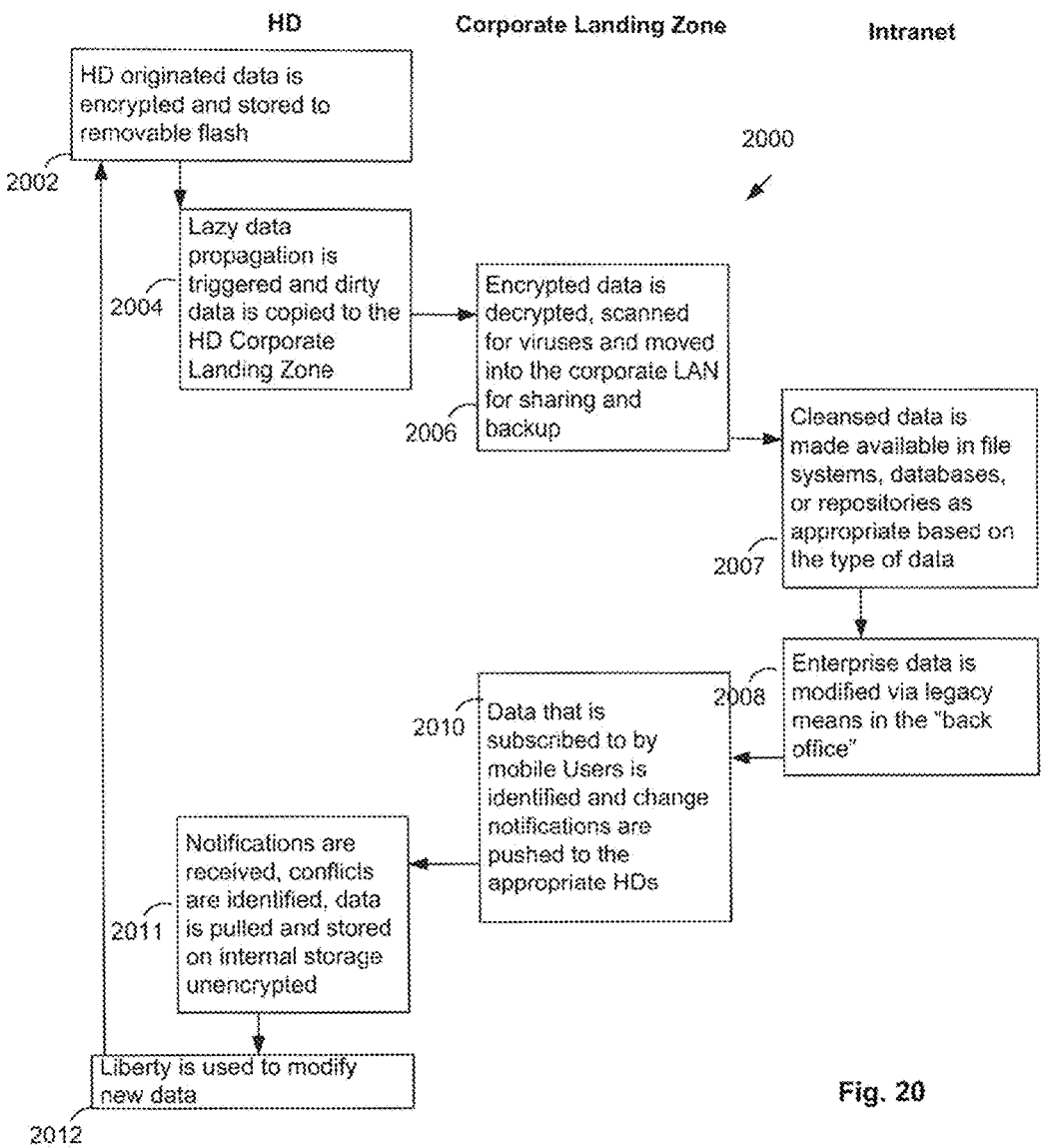
FIG. 20 is a flowchart of operations to communicate data from the handheld to the corporate network, via the corporate landing zone, in accordance with an embodiment.

FIG. 20 is a flowchart of operations 2000 to communicate data from the HD to the corporate network, via the landing zone 1910 in accordance with an embodiment. At step 2002, Data is stored to removable flash 1902R. The data is encrypted as described above. At step 2004, data propagation is triggered and "dirty" data transferred to the landing zone 1910. At 2006, the encrypted data is decrypted, scanned for viruses and transferred to the enterprise LAN (or Intranet) 1912 (e.g. for sharing and/or back-up). At 2007 the cleansed data is made available over the Intranet e.g. In a local file system, database, repository, as appropriate based on the data type or associated application. At step 2008, enterprise data is modified such as via a legacy means in the back office of the enterprise as available via the Intranet. Data that is subscribed to by users of HDs (e.g. 102) is identified and a change notifications are pushed to the appropriate HDs. At 2011, the notification is received, conflicts are resolved, and data is pulled and stored to the non-removable storage 1902 in an unencrypted form. The PA 104 (during a session with HD 102) is used to modify the data at 2012 and operations 2000 are repeated at step 2002.

Figure 4:
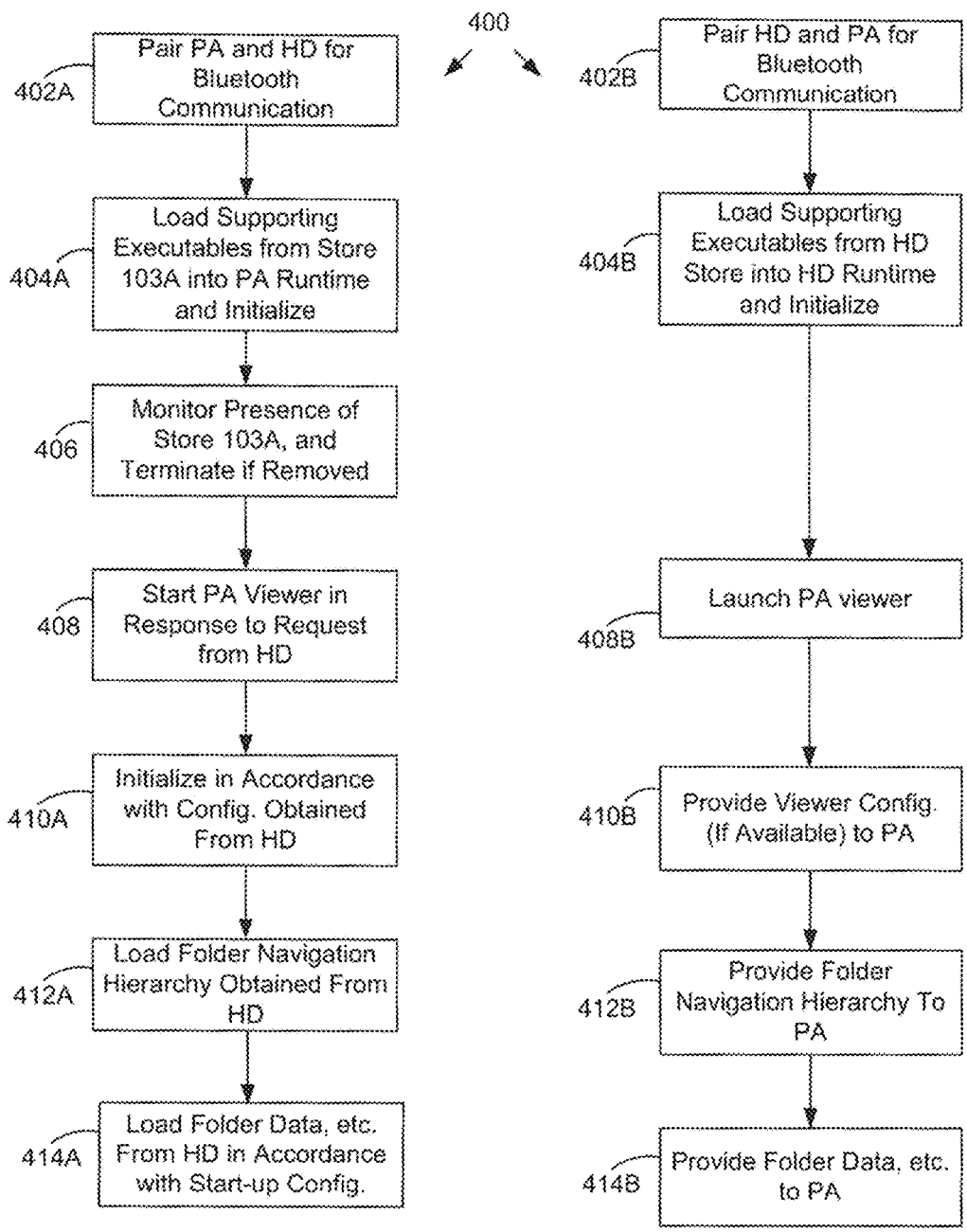
FIG. 4 is a flowchart showing operations to initialize and configure the presentation appliance for viewing data from the handheld.
Figure 5:
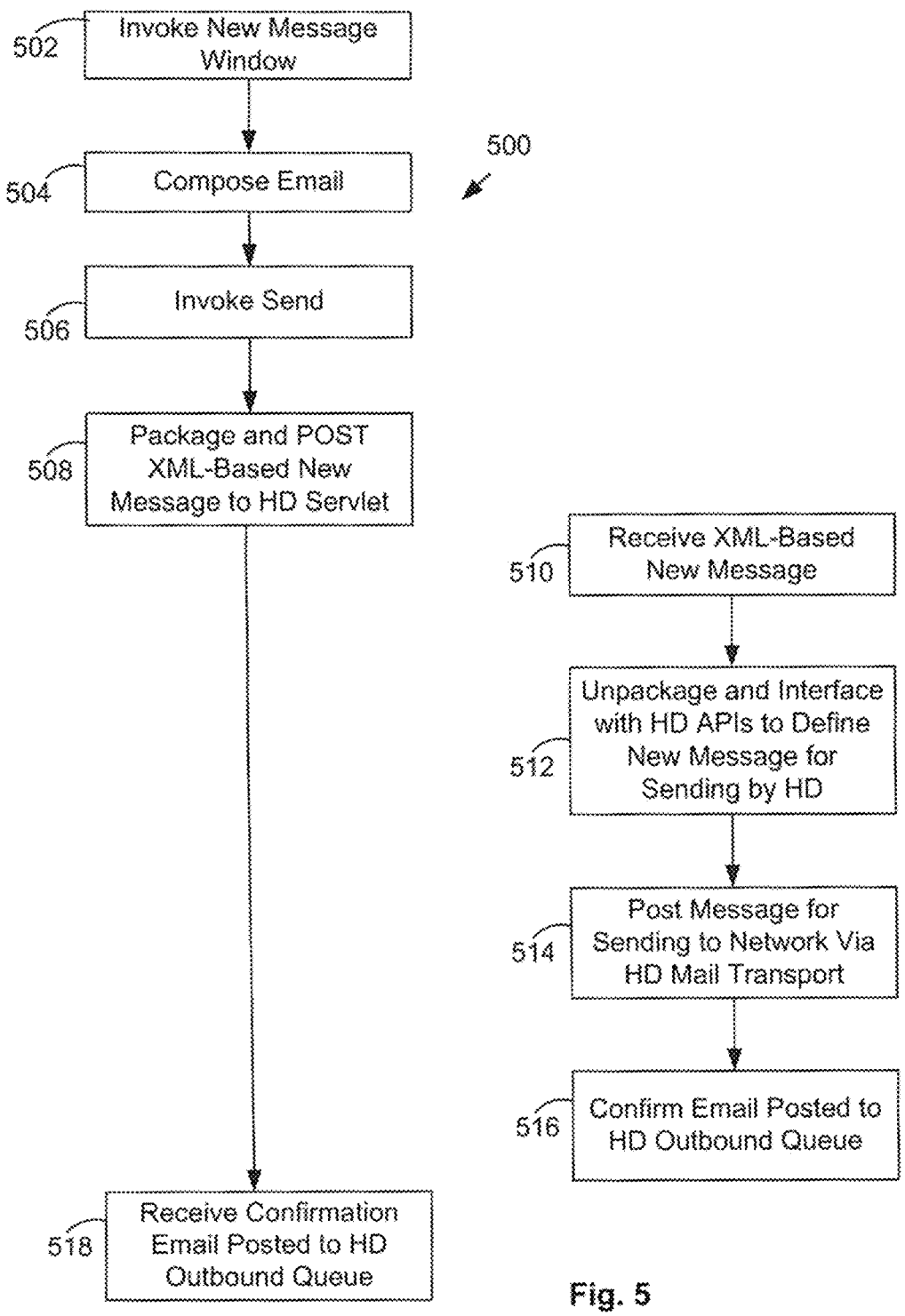
FIG. 5 is a flowchart showing operations for sending an email from the presentation appliance via the handheld.

FIG. 4 is a flowchart of respective start up operations 400 on HD 102 and PA 104 in accordance with an embodiment that establishes a connection between these devices and starts PA viewer 230 with initial PIM data from HD 102.

At steps 402A and 402B, if not already paired, devices 102 and 103A are paired for Bluetooth communication as is well known. At step 404A, initial executables are loaded from store 103A into the PA runtime (e.g. RAM 200B). PA Monitor 220 is loaded from store 103A. PA Monitor 220 loads the Bluetooth stack (222A), loads the Key software (234) that interfaces with the stack 222A and the Transport (224) and the Split Proxy and Servlet Framework (228) and loads the PA Split Proxy and Servlet Framework (228). At step 406, PA Monitor 220 then observes the execution of these components and if any are determined to be stopped, an attempt to restart is made unless the physical Key/dongle 103A is determined to have been removed, in which case it continually monitors the PA 104 for the presence of the Key/dongle before attempting to restart components.

With the PA side running the user can now interact with the HD Application (214) and launch the PA Viewer (230) remotely. At step 404B, the user starts HD Application 214 and invokes a Connect operation. Alternatively, (not shown) if HD Application 24 is already connected, the user may invoke a Restart operation (e.g. from a menu). Using the native HD O/S interfaces 216. HD Application 214 establishes an SPP Bluetooth connection to the paired PA 104 that is now listening for connections from the previously paired HD and prepares the HD Transport (208) and BD Streams (210) atop of the SPP connection (206) once established. Once connected HD initializes the HD Split Proxy and Servlet Framework (212) and starts the Servlet Server (212B) and the Web Proxy Server (212A) to use the HD Streams now configured with the SPP connection. At step 408B simple connect request is sent over the HD Transport and received by the PA Transport and passed up to the PA Split Proxy (228). At step 408A the PA Split Proxy validates the request and loads the PA Viewer 230 into PA Runtime 200B.

With PA Viewer 230 now running it looks for instructions on how to initialize itself. Preferably, it gets these instructions from a configuration file stored on HD 102 (steps 410A and 410B). In the case where the initialization is the first time launching the PA Viewer 230, no configuration file may be found and the PA Viewer can use default settings for the first time. The default settings are saved back to the HD for the user to subsequently change if desired as the configuration file (not shown).) PA Viewer makes a servlet 228B request to the HD Servlet Server 212B using a relative URL such as /viewer/getConfig to retrieve the configuration information. The configuration file is processed and the settings are maintained with the PA Viewer's runtime memory.

With its configuration information now set, PA Viewer 230 makes a request to load the folder navigation hierarchy 314 such as may be displayed on the left hand side of the user interface 300 by sending a request to the HD Servlet Server 212B using a relative URL such as /mail/getFolder-List for example (step 412A). The HD Servlet Framework 212 replies with an XML stream that tells PA Viewer 230 what and how to present the folder navigation hierarchy 314 (step 412B).

With the navigation hierarchy set, the PA Viewer can now execute on any start up configuration instructions by making further requests to the HD Servlet Server as indicated by its configuration (steps 414A and 414B). Start up instructions may include instructions to load in various PIM data from HD 102 such as message data (i.e. Inbox, sent items etc. for the Folders in 314), contact data, and calendar data, etc. For example: if configured to load the Inbox folder data on start up, a request to the HD Servlet Server using a relative URL such as /mail/getMailList is called with sufficient parameters to identify the folder for which the mail list should be returned and the mode in which the list should be returned (i.e. whether the entire list should be returned in one batch or whether the list should be paged in).

With PA Viewer 230 now started, configured uniquely by the HD configuration, and initializing its display, the user is free to interact and begin reading email, browsing contacts, calendaring and composing new messages as desired.

As new events occur on HD 102 (e.g. messages received, contact update, calendar changes, etc.) PA Viewer 230 may be updated to present the events. An event listener model is preferably provided whereby the PA Viewer can be advised of changes following start up. The event model may be applied not just to email but to any event that happens on HD 104 for visualization by the presentation layer, by providing a listener architecture for the particular resource type—e.g. Calendar, Contacts, Mail, etc. Using email as an example:

(a) On start up the HD Servlet Framework 212 registers a folderListener (not shown) for every folder 314 that could receive a new message pushed to the HD;

(b) On start up the HD Servlet Framework 212 starts an EventProcessing (not shown) thread that monitors for add and delete event messages for transmission to the PA side for presenting to the User;

(c) When a message is pushed to the HD, the folderListener is triggered and the message and folder is provided to the listener;

(d) The listener constructs a new message XML-based message and places it on the outbound event queue (not shown). For example the EventProcessor thread POSTs event:///mail/newMail when a new message arrives and includes in the POST payload an XML-based message containing information similar to the messages sent to the PA Viewer 230 on initialization;

(e) The EventProcessing thread waits for notifications from the listener and checks the queue for new events periodically;

(f) As the EventProcessing thread detects new items on the queue it packages them into an XML-based message and sends them to the PA Side for presenting via viewer 230.

With respect to the embodiment of FIG. 18, similar installation and start-up operations are performed to configure PA 1804. On installation, the BFD 1822 and NIMS 1824 are installed for respectively re-directing disk rights to the managed cache 1826 and ensuring that network interfaces 1810 remain off during a session. A operating system "userid" is defined for use during a session, the userid being assigned certain rights or privileges and being restricted from others. For example, the ability to switch to a different user (e.g. an administrative user) during a session is revoked or prevented to thwart attempts to circumvent security features that prevent the leaving of data on PA 1804.

On start of a PA, PA Monitor 220 is initiated to a get a session running. The userid is confirmed with proper rights so that the run-time restrictions are enforced before a connection is established to the HD 1802. NIMS 1824 turns off the interfaces 1810 to stop a user (knowingly or unknowingly such as via a virus) from taking data received via a session connection and sending it out over a network connection that is not managed by the HD and its connected network infrastructure. The connection to the HD is established and the user of PA 1804 can begin using the HD for example to access enterprise connected resources via the HD, email, etc.

During operation, NIMS keeps interfaces turned off. BED redirects disk writes (block level) to managed cache 1826 as volatile storage, managing the blocks trapped and written to the cache to re-serve same on subsequent reads, etc. Upon a PA system restart the "volatile storage" is removed thereby ensuring that no data is left behind on the PA 1804 during a session.

On exit of the session, the PA is restarted to remove the cache data and return to an initial state prior to the session.

With an understanding of the initial start up, configuration and initialization, representative operations for using PA viewer 230 will now be described. FIG. 5 is a flowchart of operations 500 for composing and sending an email using PA Viewer 230.

At step 502 a user launches a "new message" window using the PA Viewer controls (e.g. 306). The user composes the email, entering To recipients, CC recipients, BCC recipients, Subject line and the body of the message as desired (step 504). Where contacts 324 have been loaded either on start up (typical) or manually by the user, selecting the Contacts tab the contacts can be used in a drop down list to facilitate entering commonly used email addresses;

At step 506, with the new mail message composed, the user presses the Send control (e.g. from controls 306). PA Viewer 230 packages up the new message into an XML payload and POSTs the message data to the HD Servlet Server 212B using a relative URL like /mail/sendMessage (step 508). For the convenience of the user and in a like manner to mail composition and sending using commonly used mail applications, the email under draft may be maintained in a Draft folder (not shown) in folder tree view 314 and the outgoing email (following the send invocation) maintained in a Outbox folder (not shown).

On the HD 102, the XML-based request is received by the HD Servlet Server 212B and the request is passed to the appropriate Servlet within the Servlet Framework 212 (step 510). The sendMessage Servlet unpackages the XML and interfaces with the HD APIs 216 to create an appropriately structured email message for the HD and sends the message out the HD email transport (step 514). At steps 516 and 518, the sendMessage Servlet replies back to and the PA Viewer receives a confirmation that the email message was posted to the HD outbound queue. Though not shown, PA Viewer 230 receives an event notification to update a Sent Items folder in viewer portion 314.

Similar operations may be performed for other message activities such as Reply/Reply All, Forward, etc. To reply to a message, a user selects the desired message from the message list 316 and either right clicks it and selects "Reply" or "Reply to All" or uses the Actions menu controls 304 to do the same or uses the appropriate button in the button bar 306. PA Viewer 230 launches the email compose window similar to above but also pre-populates the Recipient Fields, sets the subject to "RE:"+subject and, optionally, makes a request to the HD Servlet Server 212B to fetch the entire content of the original message using a relative URL like /mail/fetchMessage providing appropriate parameters for the fetchMessage Servlet to fetch original email's content using the necessary HD APIs 216. PA Viewer 230 pre-populates the message body window with the original message and marks the content as "Original". The user then is free to edit any part of the message content before pressing the "Send" button 306. Similarly, PA Viewer 230 packages up the reply message into an XML payload and POSTs the message data to the HD Servlet Server 212B using a relative URL like /mail/replyToMessage providing appropriate parameters for the replyToMessage Servlet to use the necessary HD APIs 214 to construct an email message on the HD 102 that represents a reply to the original message and to subsequently send out to the HD email transport for queuing. The HD Servlet then replies with a confirmation that the message was queued for transmission.

When forwarding a message, operations are similar to replying. However, the original message is preferably not fetched and the user does not have the option to modify any of the original message content before sending. To ensure that the HD side can construct an outgoing message as a properly structured forward using the necessary HD APIs 216 for constructing an email, a distinct relative URL is called similar to /mail/sendForwardMessage.

Any of the above types of messages can be saved as a draft message to the HD storage. The steps are identical in each case except instead of the URL to send the message the URL indicates that a draft should be saved instead. For example the relative URL /mail/saveForwardMessage instructs the HD side Servlet Framework to use the necessary HD APIs to construct an appropriately formatted message that could be forwarded using the HD email transport but to instead simply store the message as a draft for subsequent further editing and sending at a later time.

Often an email includes an attachment document. An attachment document may comprise data intended for a specific application. Common examples are word processing documents (e.g. for MS Word), image documents (.tiff, .GIF. jpeg) and portable document format documents (i.e. PDFs). To reduce wireless bandwidth consumption, minimize HD storage requirements and reduce HD data rendering requirements, email data communication to the handheld device may not include data for attachments or (whether on user request for attachment data or automatically) may include only reduced data therefore. For example, a word processing document attachment may include only limited text and formatting data for the handheld.

Advantageously, PA 104, particularly in laptop form, usually has adequate storage and native applications for working with such attachments in native form. FIG. 6A illustrates an alternative embodiment 600 of network 100 in which the servers coupled to LAN 112 are different from FIG. 1. LAN 112 may be configured to include an attachment server 602, for example using IMAP or POP protocols, to extract an email with its attachment from email server 118, on a request received from PA viewer 230 via HD 102, and deliver in native form the attachment in response to PA Viewer 232 through HD 102.

Figure 7:
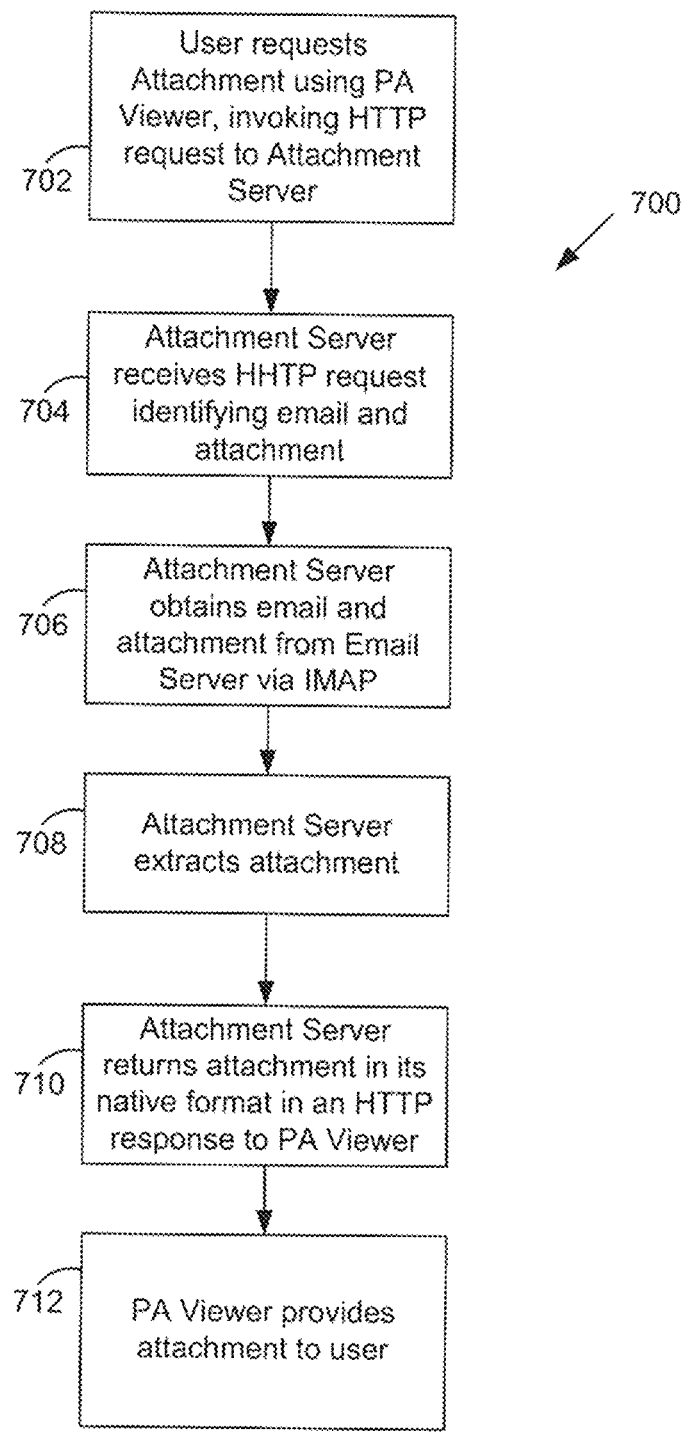
FIG. 7 is a flowchart showing operations to obtain an email attachment in an associated application (i.e. native) format.

FIG. 7 illustrates operations 700 for obtaining an email attachment in its native format using server 602. PA Viewer 230 facilitates a user to selectively request (not shown) a particular attachment associated with an email. Upon user request, PA Viewer sends an HTTP request via the split proxy (step 702). The request identifies the email having the attachment in email server 118. The request is directed through HD 102 to LAN 112 and thereafter via server 116 to attachment server 402 (step 704). As noted, attachment server 402 has access to email server 118 via IMAP protocols. Attachment server 402 obtains the email with the attachment from server 118 (step 706), extracts the attachment (step 708), and returns the attachment in its native format in an HTTP response to the PA Viewer (step 710). PA Viewer then provides the attachment to the user.

An option to save attachment to PA storage may be given to a user—preferably this option can be disabled when required by enterprise deployments. Where an associated application is available on the PA for a given attachment type it can be launched to render the attachment for viewing and/or editing Alternatively, web-based applications can be used to do the same by either:

(a) having the PA request that the attachment be posted to a shared application server such as docs.google.com or similar type of service and subsequently launching a browser to the appropriate URL on the application server; or (b) saving the attachment to the HD storage, posting the saved attachment to an application server similar to a) above and then launching a browser to the appropriate URL on the application server similar to a) above;

In another embodiment, an attachment server may be configured similarly to attachment server 602 to pull the email and its attachment and forward the attachment to the requesting PA Viewer. For example, PA Viewer can be configured to send attachment requests to the attachment server. That attachment server is configured with an email account for the HD and an attachment server processing capability as described with reference to server 602. To obtain the attachment, the email of interest containing attachment(s) is first forwarded via the PA application to the attachment server, via standard SMTP/SMIME protocols, to an email account specific to the HD. The PA then requests the attachment of interest using an HTTP/S request similar to the request response described above with reference to FIG. 7. The attachment server pulls the email and native format attachment from email server 118 behind the firewall 114 to provide in response to the PA 104. This attachment server may be one hosted outside the enterprise beyond LAN 112 or within the environment of LAN 112. As will be understood to persons of ordinary skill in the art, an externally hosted-server may require different security to access email server 118 behind firewall 114. Hosting the attachment server within the LAN 112 may be preferable to meet IT standards for the enterprise.

FIG. 6B illustrates an alternative embodiment 640 of network 100 and network 600 in which LAN 112 is again different. In this embodiment 640, LAN 112 comprises a Key Server 642 for encrypting communications between PA 104 and HD 102, providing an encryption key and an authentication token as described further in accordance with FIG. 8.

Figure 8:
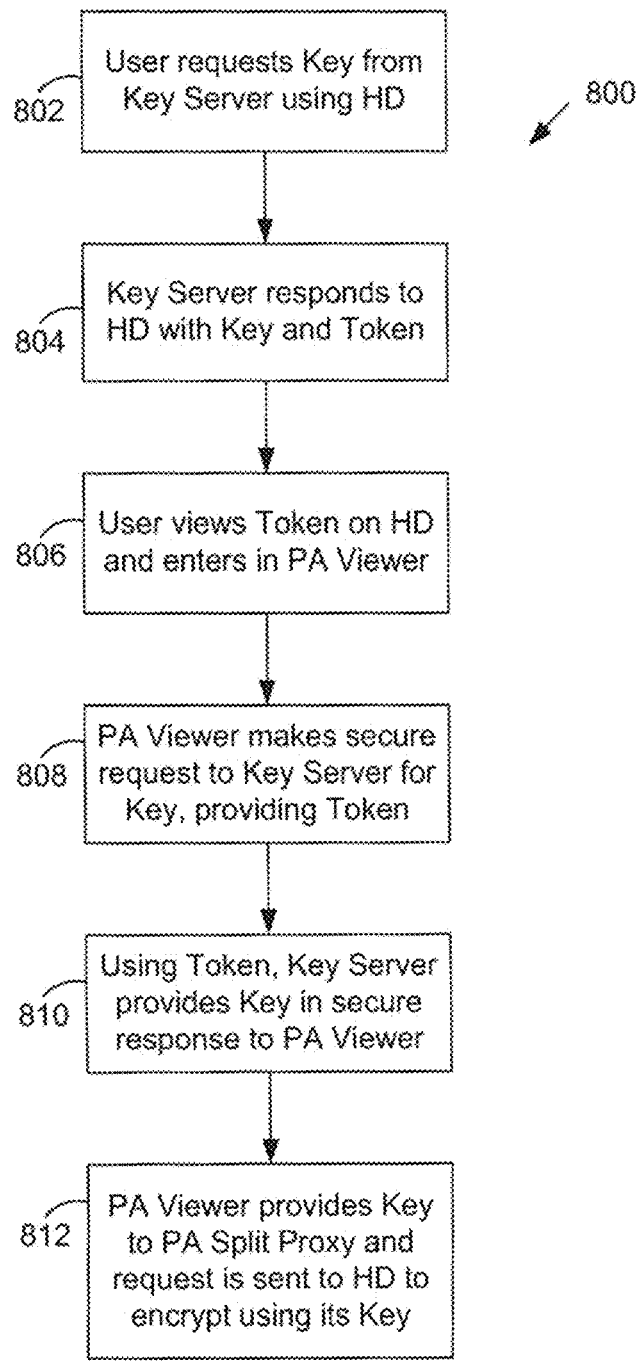
FIG. 8 is a flowchart showing operations to configure a portion of the communication network for encrypted communications in accordance with an embodiment.

FIG. 8 illustrates a flowchart of operations for encrypting a portion of a communication network such as network 640. At step 802, using the HD application 214, the user makes an HTTP request over the handheld's secure wireless infrastructure (via server 108 and 116) to the Key Server 642 for a private key.

At step 804, Key Server 642 responds with a private key preferably comprising a generated pseudo-random array of bytes (e.g. a minimum of 128 bits and configurable) and a third-factor authentication token comprising a separate generated pseudo-random string of at least 8 characters (configurable).

At step 806, HD Application 214 receives the key and token and displays the token which is entered into PA Viewer 230. Alternatively, the token could be sounded for the user.

PA Viewer 230 establishes a TLS 1.0 Secure connection to Key Server 642 by way of the PA split proxy software components described in FIG. 2 and requests the same private key that was obtained in step 602 by providing the token in an HTTPS/TLS request (step 808).

At step 810 Key Server 642 uses the token to lookup the private key that was provided in step 802 and returns that key in the response to the request. At step 812, once the private key is received by PA Viewer 230, it is provided to the PA side of the split proxy 228 and a request is sent to the HD side 212 indicating that all subsequent data transmission shall be encrypted using the private key just obtained.

Figure 9:
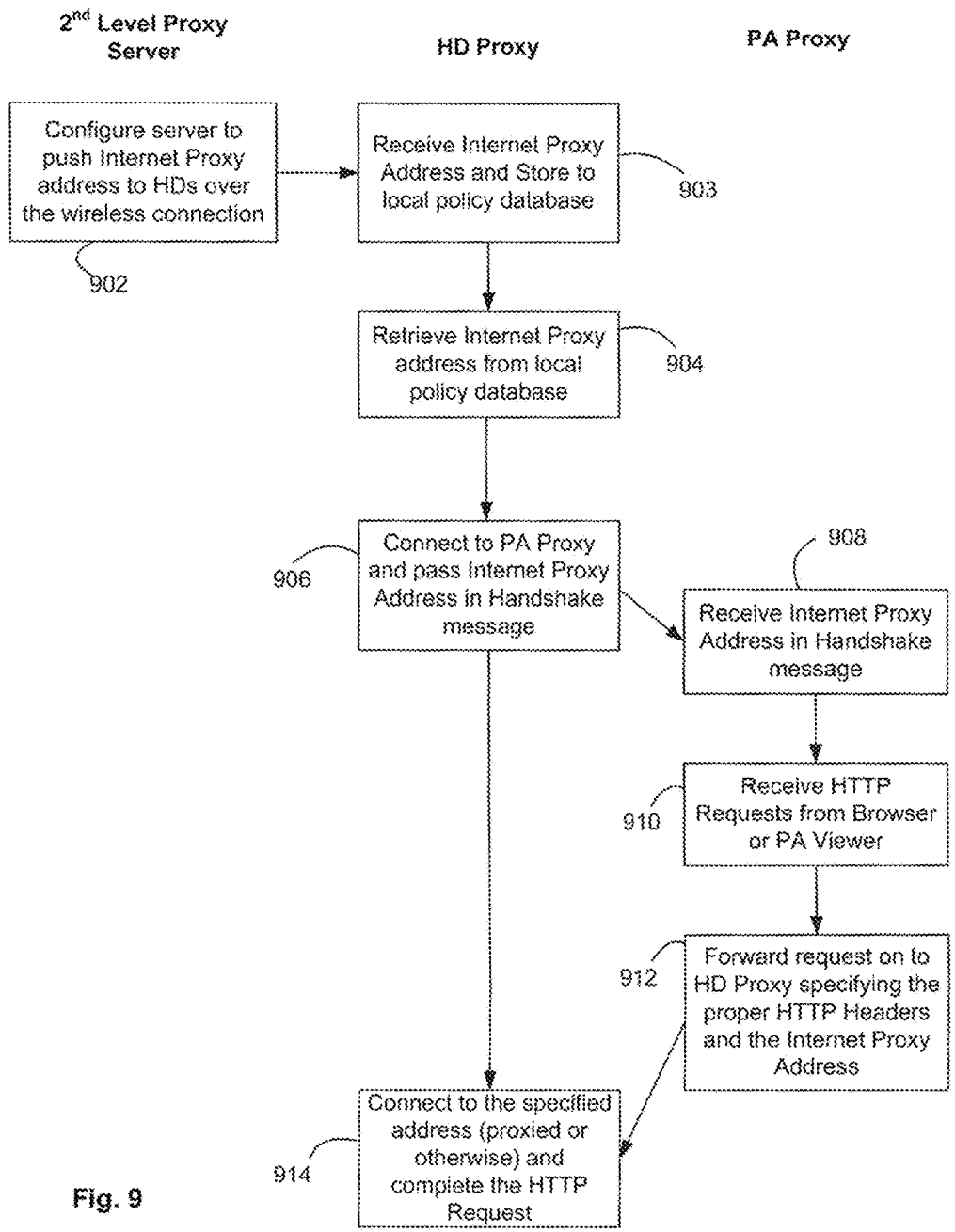
FIG. 9 is a flowchart showing the automated discovery of static network proxy settings in accordance with an embodiment.
Figure 10:
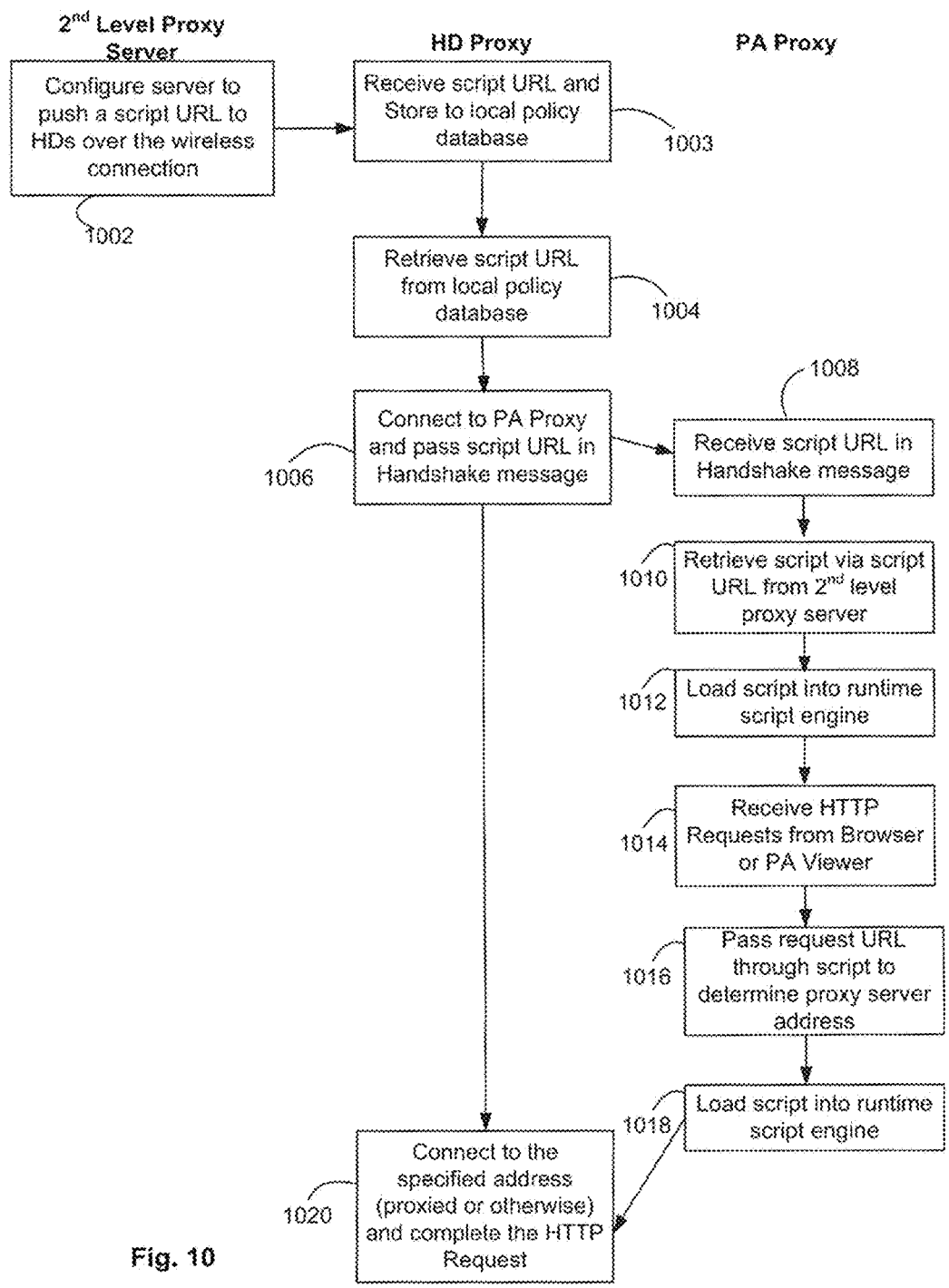
FIG. 10 is a flowchart showing the automated discovery of dynamic network proxy settings in accordance with an embodiment.
Figure 11:
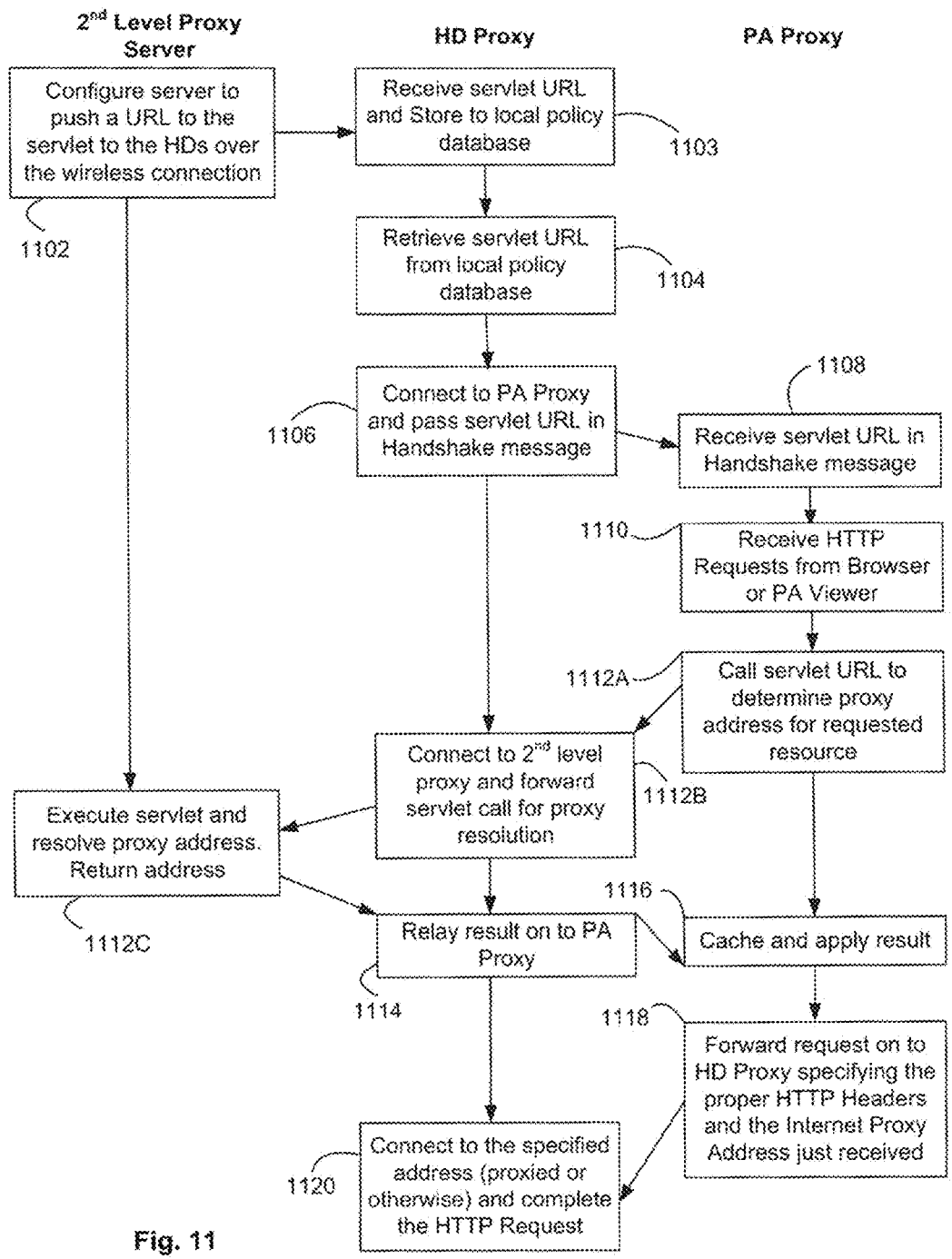
FIG. 11 is a flowchart showing the automated discovery of dynamic network proxy settings in accordance with another embodiment.

With reference to FIGS. 1, 2 and 9-11, communications from an application (e.g. browser 232) on PA 104 to a target resource on an Internet 110 or Intranet 112 typically travels through at least two proxies. The first is the split proxy server 212 and 228 and the second is HD enterprise server 116. This second proxy 116 can, for example, also operate as a firewall 114. FIGS. 9 to 11 illustrate operations for configuring and operating the split proxy server 212 and 228 to communicate with the third proxy server 130 or servers 130-1, 130-2, . . . 130-$n$ providing access to Internet or Intranet resources. Proxy 116 on the wireless infrastructure is referred to as the "$2^{nd}$ Level Proxy" in the flow charts of FIGS. 9 to 11. It is common for an enterprise to require that communications from the wireless infrastructure proxy 116 travel through another (third) proxy such as proxy 130 in order to gain access to resources on the Internet 110 or Intranet 112. Enterprises may further direct such communications (i.e. from the proxy on the wireless infrastructure) through different third level proxies 130-1, 130-2, . . . , 130-$n$ depending on the type or address of the resource requested. Browsers are typically configured for access to the Internet or Intranet resources either by being configured with a single static proxy address or by being configured with a URL to a script that determines the proxy address given the resource address.

The two parts of the split proxy, HD Split Proxy and Servlet Framework 212 (the "HD Proxy") and the PA Split Proxy and Servlet Framework 228 (the "PA Proxy"), work in tandem to provide a full-featured proxy to browser 232. For performance reasons HD Proxy 212 may not process headers, but instead may rely on the PA Proxy 228 to instruct it as to which address to connect to in order to retrieve the requested resource. HD Proxy 212 is provided access to the enterprise network 112 via HD enterprise server 116 residing on the wireless infrastructure. As such, the typical means available for configuring a browser on a PC to communicate with the Internet or Intranet resources in an enterprise via third proxy 130 are not inherently available using the split-proxy configuration.

FIG. 9 illustrates a method for providing access to Internet or Intranet resources via the third level proxy in accordance with an embodiment in which the enterprise requires that all requests for such resources be directed through a single proxy server (i.e. 130). Proxy server 116 on the wireless infrastructure passes (e.g. pushes) a parameter representing the address of the enterprise's proxy server 130 to HDs that it manages and that are configured to use the split-proxy server (block 902). The parameter is received and stored to a local policy database by the HD Proxy representing the address of the enterprise's proxy server 130, (block 903). The HD Proxy retrieves this parameter (block 904) and passes it to the PA proxy on initial connection (blocks 906 and 908). With the PA Proxy now informed of the address of the enterprise's proxy server 130, it can instruct the HD Proxy to connect to the enterprise's proxy server 130 on all subsequent requests for resources from the browser 232 on the PA (see e.g. 910, 912, 914). In an alternate embodiment, step 902 may be omitted and the proxy address provided to HD Proxy by other means such as by inputting through a user interface.

An enterprise may require that access to Internet or Intranet resources be dynamically routed through different proxies (e.g. 130-1, 130-2, . . . , 130-$n$) depending on the nature of the resource being requested. In such situations browsers typically use scripts to determine the appropriate proxy server to target. FIG. 10 illustrates a method for communicating in such an enterprise network using the split-proxy configuration according to one embodiment. HD server enterprise server 116 on the wireless infrastructure passes (e.g. pushes) a parameter representing a URL address of a script for determining the appropriate proxy server to target to HDs that it manages and that are configured to use the split-proxy system (block 1002). The HD receives and stores the parameter to a local policy database representing the URL address of the script for determining the appropriate proxy server to target (block 1003). The HD Proxy retrieves the parameter (block 1004) and then passes it to the PA Proxy on initial connection (blocks 1006, 1008). The PA Proxy then retrieves (block 1010) the script from the wireless interface proxy using the URL parameter and loads the script into a runtime script engine (block 1012). When an HTTP request is received by the PA Proxy (block 1014) the PA Proxy passes the request URL through the script to determine the proxy server address (block 1016). The request is then formatted (to specify the HTTP Headers and the wireless interface proxy address) before being sent to the HD Proxy (block 1018). The HD Proxy completes the HTTP request thereafter (block 1020) using the resolved proxy server address. With the PA Proxy now informed of the script location it can retrieve the script on startup via the proxy on the wireless network. With the script loaded dynamically it remains current and the PA Proxy can continue to instruct the HD Proxy to connect to addresses dynamically based on the results of the script's execution given all subsequent requests for resources from the browser on the PA.

In another embodiment of the method of FIG. 10 in which network communications are dynamically routed through different proxies depending on the nature of the resource being requested before accessing the Internet or Intranet resources, operations of block 1002 may be omitted. The parameter may be received by the HD by other means such as though input via a user interface.

When an enterprise requires network communications to be dynamically routed through different proxies depending on the nature of the resource being requested, scripts typically used to determine the appropriate proxy server to target may rely on information only available when the application requesting the resource is directly connected to the enterprise's network. For example, an enterprise may require a certain proxy to be used if the domain of the resource requested resides in the enterprise's Domain Name System (DNS) and if it does not reside in the DNS a different proxy may be required. Running a script on the HD or PA will not correctly resolve the proxy address unless the script accesses the enterprise to determine the contents of the DNS.

In one embodiment, depicted in FIG. 11, a method is provided for determining the appropriate addresses of the enterprise proxies 130-1, 130-2, . . . 130-$n$ addresses based on the domain or resource type or address via a script run on a proxy server in the wireless infrastructure. A parameter representing the URL address of a servlet software method or script on the $2^{nd}$ Level Proxy Server is passed (e.g. pushed) to the HD (block 1102) by server 116. The parameter (e.g. URL) is received and stored to a local policy database (block 1130). Alternatively the URL address of a servlet software method or script may be received by HD Proxy by other means such as by input via a user interface. HD proxy may retrieve the URL (block 1104). Given the address of a resource being requested the software method will return the proxy address (e.g. 130-1, 130-2, . . . , 130-$n$) required by the enterprise.

The parameter may be passed from the HD Proxy to the PA Proxy on initial connection (blocks 1106, 1108). Alternatively, HD Proxy can call the script and determine the proxy address without the need for the PA Proxy. The HD Proxy (or the PA Proxy if it has the parameter) can call the software method with the resource address as input (blocks 1112A, 1112B, 1112C). The resulting proxy address is passed back from the wireless infrastructure proxy to the PA Proxy (block 1114) (and then cached to the PA Proxy if necessary, block 1118). The HTTP headers and the wireless infrastructure proxy address are formatted into the original HTTP request which is then sent back to the HD Proxy (block 1118). The HD Proxy then completes the HTTP request (block 1120) using the resolved proxy address. With the PA Proxy now informed of the URL address of the script, it can call the servlet (blocks 1112A, 1112B, 1112C) using the HTTP request and dynamically resolve the proxy address for accessing the HTTP resource. Further, with the HD Proxy (and possibly the PA Proxy) now informed of the enterprise's proxy address for a certain resource request, the HD Proxy can (or the PA Proxy can instruct the HD Proxy) to connect to the enterprise's proxy address on all subsequent requests for that resource from the browser on the PA.

As noted above, the presentation layer virtualization can be automatically stopped on PA 104 in response to certain events, particularly those events which suggest an opportunity for persons other than the user to have access to the virtualized data (e.g. when the user is not proximate to the PA 104). For example, in the illustrated embodiments PA 104 and HD 102 are coupled via short range radio communications and PA 104 is provided with a flash drive dongle 103A storing executables implementing aspects of the invention. The Bluetooth connection between HD 102 and PA 104 may be stopped such as when they go out of range, (e.g. when HD 104 is taken away from PA 104 by the user). The connection may be stopped when the dongle is removed from PA 104. Under these circumstances, it is likely that the user does not want third parties to have access to data that may be virtualized to a PA display device. Such events preferably trigger a removing of virtualized data from the display. This can be accomplished in different ways including a shutdown of PA viewer 230, for example.

Monitoring of the HD-PA connection status and dongle 103A attachment to PA 104 may be performed in various ways. For example, as PA Monitor 220 is launched from dongle 103A, it is aware of its home drive/root. PA Monitor 220 can be apprised of the Bluetooth connection status (e.g. via stack 222A) which status may be presented to the user. On a connection termination, PA Monitor 220 can prompt the user to shut down. A default operation may be configured such that if no response is received within a predetermined time, the PA Viewer is automatically stopped. Such a timer permits a user to re-establish a connection to continue operations and takes into account a user having left the proximity of the PA 104 with the HD 102.

If no connection between PA 014 and HD 102 is present, PA Monitor 220 can poll access to its root (dongle 103A) and immediately stop PA Viewer 230 (and other components as may be desired) if dongle 103A is no longer present. PA Monitor 220 may remain executing awaiting a further connection. Should dongle 103A be replaced and the connection started, PA Monitor 220 can be advised whereupon dongle 103A polling is stopped and the components (e.g. 224-230) restarted as necessary. Similarly stack 222A could be configured to monitor the presence of dongle 103A when a connection is not available, and advise PA Monitor 220 of such to invoke the automatic shutdown as described above. Stack 222A could remain executing, polling to re-open the device 103A. Once stack 222A successfully, opens the device 103A again, after it is reinserted, PA Monitor 220 is notified to begin the (re-)start cycle. Other variations will be apparent to those of ordinary skill in the art.

Detailed diagrams for HD 102 and PA 104 are not provided as such will be understood to persons of ordinary skill in the art. PA 104 may comprise a laptop or PC or other computing device with sufficient resources to execute a browser and render to a display device the presentation layer of the HD. This device need not have inherent network access per se as such can be provided by the HD. However, a PA will include an I/O interface through which to communication with the HD and such may include an inherent short range communication capability such as Bluetooth wireless or a serial communication interface (e.g. USB). As shown, a USB interface may be configured (e.g. via dongle 103A) to provide wireless short range communication capabilities to a PA.

Suitable devices that may be configured as an HD 102 are two-way communication devices having advanced data communication capabilities including the capability to communicate with other computer systems. Depending on the functionality provided by such a devices, it may be referred to as a data messaging device, a two-way pager, a cellular telephone with data messaging capabilities, a wireless Internet appliance, or a data communication device (with or without telephony capabilities). In some embodiments, a handheld device may have both Wi-Fi (or similar) transceiver and cellular transceiver capabilities and may communicate in respect modes with any one of a plurality of access points and base station transceiver systems within its geographic coverage area. Such a device will typically provide one or more data communication applications such as a messaging application and/or browser. A preferred application that may be provided by such a handheld device may be a personal information manager (PIM) application having the ability to organize and manage data items for the user such as, but not limited to, e-mail, calendar events, voice mails, appointments, and task items. Naturally, one or more memory stores are available on the handheld device to facilitate storage of applications and data. Preferably, handheld device includes a short-range communications subsystem that provides for communication between the handheld device and different systems or devices, which need not necessarily be similar devices, such as PA 104. For example, such a subsystem may include a Bluetooth communication module to provide for communication with similarly enabled systems and devices. The handheld device may also include an I/O interface for wired communications such as one or more serial communication interfaces.

Though shown communicating wirelessly via Bluetooth throughout the embodiments, HD 102 and PA 104 may be coupled in other manners that preferably provide sufficient throughput to support the application to be executed by the PA. For example, they can be coupled wirelessly in accordance with other protocols such as wireless USB or coupled in a wired mode. Though primarily described with reference to handheld devices, persons of ordinary skill in the art will appreciate that other mobile wireless communication devices with similar attributes are suitable.

The execution of applications in a contained execution environment such as in the embodiments of FIG. 12 and FIG. 13 are described separately from the data containment embodiment of FIG. 18. However, it is understood that these embodiments may be combined (e.g. 12 and 18 or 13 and 18) such that applications may run in a container and data may be contained by BFD. WebDAV may be provide atop the VFS as described.

Advantageously, the PA and HD may be coupled to virtualize the HD's presentation layer. Virtualized access is provided to HD applications and browser access is provided to the enterprise and Internet. Using encrypted communications maintains a same level of security from the HD to the Presentation Appliance as there is from the enterprise to the HD. On many handheld devices, including leading devices, inherent limitations with memory, threads, network connections and other resources make it very difficult to support a fully functional browser environment. To solve other problems inherent in wireless networks and with rendering HTML-based web pages on tiny handheld devices, a network side HTTP proxy is often used that transcodes the HTML as part of the wireless device network infrastructure reduce data communications requirements but at the expense of a fully complaint HTTP 1.1 experience. In accordance with the invention, the split proxy components are enabled to provide and support open Internet standard protocols such as full HTTP 1.1, HTTP/S, TLS and SSL.

Although specific embodiments of the invention have been described herein, it will be understood by those skilled in the art that variations may be made thereto without departing from the spirit of the invention or the scope of the appended claims.

The invention claimed is:

1. A method at a wireless communication device, comprising:
    monitoring a direct data connection from the wireless communication device to a computing device;
    communicating data, from the wireless communication device, via the data connection to the computing device, the computing device being configured to display the communicated data on a display on the computing device;
    detecting, by the wireless communication device, that the data connection has ceased; and
    sending, from the wireless communication device, in response to the detecting, a trigger to the computing device that configures the computing device, to cease display, on the computing device, of the data previously communicated to the computing device.

2. The method of claim 1, further comprising detecting when the data connection is broken and establishing a reconnection with the computing device.

3. The method of claim 1, wherein communicating comprises securely communicating the data via a private network.

4. The method of claim 1, wherein the data is communicated via short-range radio communications.

5. The method of claim 1, further comprising receiving, from the computing device, communications via the data connection for accessing an application programming interface to enable the computing device to operate the wireless communication device.

6. The method of claim 1, further comprising, via the data connection, invoking, by the wireless communication device, a start of a user interface for the display of the data on the computing device.

7. The method of claim 6, further comprising stopping the user interface for the display of the data on the computing device immediately when communication of the data via the data connection ceases.

8. The method of claim 1, further comprising communicating via a split proxy between the wireless communication device and the computing device.

9. A non-transitory computer-readable storage device having computer-readable code executable by at least one processor of the wireless communication device to perform:
    monitoring of a direct data connection from a wireless communication device to a computing device;
    communicating data, from the wireless communication device, via the data connection to the computing device, the computing device being configured to display the communicated data on a display on the computing device;
    detecting, by the wireless communication device, that the data connection has ceased; and
    sending, from the wireless communication device, in response to the detecting, a trigger to the computing device that configures the computing device, to cease display, on the computing device, of the data previously communicated to the computing device.

10. A wireless communication device comprising:
a communications device;
a processor operably coupled to the communications device and configured to:
    monitor a direct data connection from a wireless communication device to a computing device;
    communicate data securely from the wireless communication device via the data connection to the computing device, the computing device being configured to display the communicated data on a display on the computing device;
    invoke a start of a user interface for the display of the data on the computing device;
    detect that the data connection has ceased; and
    send, to the computing device, in response to the detecting, a trigger that configures the computing device to stop the user interface for the display of the previously communicated data on the computing device immediately when the data connection ceases.

11. The wireless communication device of claim 10, wherein the processor is further configured to detect when the data connection is broken and establish a reconnection with the computing device.

12. The wireless communication device of claim 10, wherein the communications device comprises a short-range radio communication device that communicates the data.

13. The wireless communication device of claim 10, wherein the processor is further configured to receive, from the computing device, communications via the data connection for accessing an application programming interface to enable the computing device to operate the wireless communication device.

14. A method comprising:
    monitoring a direct data connection from a wireless communication device to a computing device;
    receiving, by the computing device, data via the data connection with the wireless communication device,
    displaying the data on a display of the computing device;
    detecting, by the computing device, that the data connection is interrupted; and
    in response to detecting one of interruption of the data connection, and an instruction from the wireless communication device, automatically discontinuing display of the data previously received from the wireless communication device.

15. The method of claim 14, wherein receiving comprises securely receiving the data via a private network.

16. The method of claim 14, wherein the data is received via short-range radio communications.

17. The method of claim 14, further comprising, via the data connection, communicating instructions for accessing an application programming interface to enable the computing device to operate the wireless communication device.

18. The method of claim 14, further comprising, via the data connection, receiving, from the wireless communication device, an invocation to a start a user interface for the display of the data.

19. The method of claim 14, further comprising communicating via a split proxy between the wireless communication device and the computing device.

20. A computer-readable storage device having computer-readable code executable by the computing device to:
   monitor a direct data connection from a wireless communication device to a computing device;
   receive, by the computing device, data via the data connection with the wireless communication device;
   display the data on a display of the computing device;
   detect, by the computing device, that the data connection is interrupted; and
   in response to detecting one of interruption of the data connection and an instruction from the wireless communication device, automatically discontinue display of the data previously received from the wireless communication device.

21. A computing device comprising:
a display;
a communications device;
a processor operably coupled to the communications device and configured to:
   monitor a direct data connection from a wireless communication device to the computing device;
   receive data from the wireless communication device via the data connection with the wireless communication device;
   display the communicated data on a display on the computing device;
   receive, from the wireless communication device, an invocation to start a user interface for the display of the data on the display;
   detect that the data connection is interrupted; and
   in response to detecting one of interruption of the data connection and an instruction from the wireless communication device, automatically discontinue the user interface for the display of the data on the display and cease the display of the data previously received via the data connection.

22. The computing device of claim 21, wherein the communications device comprises a short-range radio communication device that communicates the data.

23. The computing device of claim 21, further configured to, via the data connection, communicate instructions for accessing an application programming interface to enable the computing device to operate the wireless communication device.

24. The computing device of claim 21, further configured to stop a user interface for the display of the data on the computing device immediately when the data connection is interrupted.

25. The computing device of claim 21, further configured to communicate via a split proxy between the wireless communication device and the computing device.

26. The computing device of claim 21, further configured to detect removal of a flash drive configured to store executable code for the user interface for the display of the data and discontinue the user interface for the display of the data immediately upon detecting the removal of the flash drive.

* * * * *